US005610355A

United States Patent [19]

Hasebe et al.

[11] Patent Number: 5,610,355

[45] Date of Patent: Mar. 11, 1997

[54] ELECTRICAL MUSICAL INSTRUMENT USING A TIME INTERVAL DETERMINED BY A LINEAR SCRAPER OPERATOR TO ADJUST MUSICAL PARAMETERS

[75] Inventors: Masahiko Hasebe; Yasushi Kurakake; Junichi Mishima; Yasuhiko Asahi; Satoshi Uehara, all of Hamamatsu, Japan

[73] Assignee: Yamaha Corporation, Hamamatsu, Japan

[21] Appl. No.: 361,889

[22] Filed: Dec. 22, 1994

Related U.S. Application Data

[63] Continuation of Ser. No. 1,093, Jan. 6, 1993, abandoned.

[30] Foreign Application Priority Data

| | | | |
|---|---|---|---|
| Jan. 8, 1992 | [JP] | Japan | 4-019481 |
| Jan. 8, 1992 | [JP] | Japan | 4-019482 |
| Jan. 8, 1992 | [JP] | Japan | 4-019483 |

[51] Int. Cl.[6] .................... G01P 3/00; G10H 5/00

[52] U.S. Cl. .................... 84/658; 84/670; 84/743; 84/DIG. 12

[58] Field of Search .................... 84/600, 653, 658, 84/659, 662, 670, 678, 687, 723, 743, DIG. 12; 338/69

[56] References Cited

U.S. PATENT DOCUMENTS

| | | | |
|---|---|---|---|
| 3,699,492 | 10/1972 | Yoshihara | 338/69 |
| 4,529,959 | 7/1985 | Ito et al. | 338/69 |
| 4,892,023 | 1/1990 | Takeuchi et al. | 84/687 |
| 5,157,213 | 10/1992 | Kashio et al. | 84/658 |
| 5,200,568 | 4/1993 | Fukushima et al. | 84/658 |
| 5,223,655 | 6/1993 | Watanabe et al. | 84/DIG. 12 |
| 5,247,131 | 9/1993 | Okamoto et al. | 84/658 |
| 5,254,804 | 10/1993 | Tamaki et al. | 84/626 |
| 5,266,737 | 11/1993 | Okamoto | 84/658 X |
| 5,278,350 | 1/1994 | Okamoto et al. | 84/658 |

FOREIGN PATENT DOCUMENTS

| | | |
|---|---|---|
| 374426 | 3/1962 | Japan . |
| 504144 | 2/1975 | Japan . |
| 5843496 | 3/1983 | Japan . |
| 5840794 | 3/1983 | Japan . |
| 3192396 | 8/1991 | Japan . |
| 3215895 | 9/1991 | Japan . |

*Primary Examiner*—William M. Shoop, Jr.
*Assistant Examiner*—Jeffrey W. Donels
*Attorney, Agent, or Firm*—Loeb & Loeb LLP

[57] ABSTRACT

An electronic musical instrument including: a scraper operator having a predetermined operation length in a predetermined operation direction, for detecting at least one of access, contact, and push of an operating member, and generating a plurality of signals to be detected within the range of the operation length; a time interval generating unit for receiving the signals detected by the scraper operator and generating a time interval signal representing a time difference between consecutively detected signals; and a tone signal synthesizer for generating a tone signal in accordance with the detected signal and the time interval signal each time the scraper operator generates the signal to be detected. Signals indicating the position, speed, and acceleration are derived from a plurality of consecutive signals time sequentially detected, providing various control ways of musical tone signals.

17 Claims, 19 Drawing Sheets

| SCRAPER ASSIGN MEMORY | | | | | | |
|---|---|---|---|---|---|---|
| X | TONE COLOR NAME | TBLASS (n) n=0 | 1 | 2 | 3 | ---- |
| 0 | BASS DRUM | BD | BD | BD | BD | |
| 1 | TOM-TOM | TOM | TOM | TOM | TOM | |
| 2 | CONGA | CO | CO | CO | CO | |
| 3 | BONGO I | | | | | |
| 4 | BONGO II | | | | | |
| 5 | HH | | | | | |
| 6 | MARIMBA | | | | | |
| ⋮ | ⋮ | | | | | |
| 15 | MIX | | | | | |

FIG. 8A
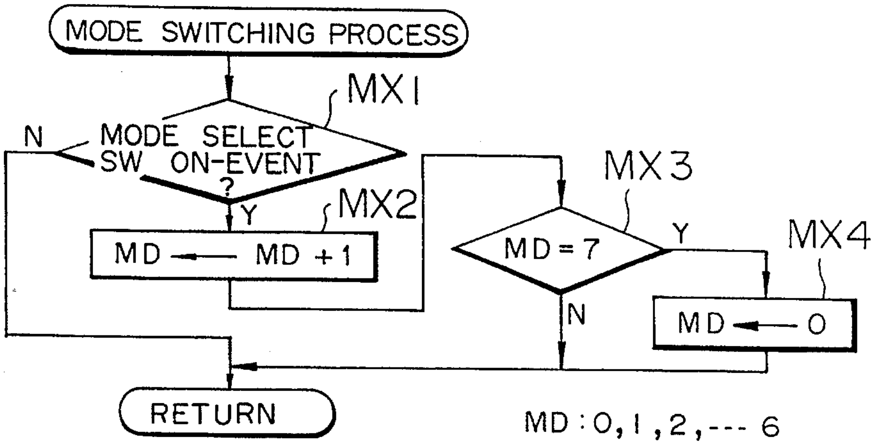
FIG. 8B
| A / B | |
|---|---|
| 0 | PITCH |
| 1 | TONE COLOR |
FIG. 8C
| C / D | | | |
|---|---|---|---|
| 0 | 0 | C = 0 | D = 0 |
| 0 | 1 | C = 0 | D = 1 |
| 1 | 0 | C = 1 | D = 0 |
| 1 | 1 | C = 1 | D = 1 |
FIG. 8D
| MODIFICATION MODE | | | | |
|---|---|---|---|---|
| MD | A/B | C | D | MODIFIED PARAMETER |
| 0 | 0 | 1 | 0 | PITCH |
| 1 | 0 | 0 | 1 | VOLUME |
| 2 | 0 | 1 | 1 | PITCH, VOLUME |
| 3 | 1 | 1 | 0 | TONE COLOR |
| 4 | 1 | 0 | 1 | VOLUME |
| 5 | 1 | 1 | 1 | TONE COLOR VOLUME |
| 6 | 0/1 | 0 | 0 | NONE |
FIG. 8E
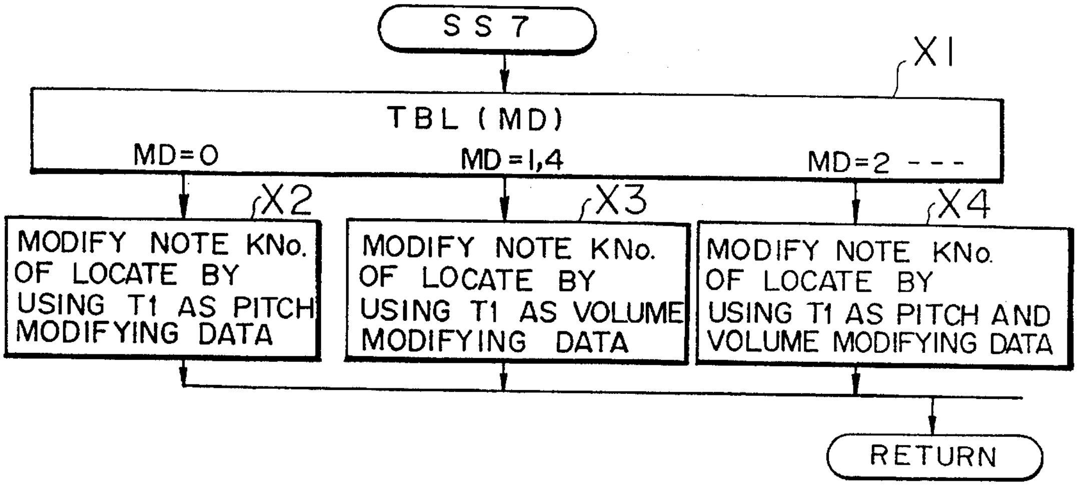

ELECTRICAL MUSICAL INSTRUMENT USING A TIME INTERVAL DETERMINED BY A LINEAR SCRAPER OPERATOR TO ADJUST MUSICAL PARAMETERS

This is a continuation of application Ser. No. 08/001,093, filed Jan. 6, 1993, now abandoned.

BACKGROUND OF THE INVENTION a) Field of the Invention

The present invention relates to electronic musical instruments, and more particularly to electronic musical instruments suitable for generating musical sounds of rhythm instruments rich in variations by using not a keyboard but a performance operator.

b) Description of the Related Art

Electronic musical instruments essentially a potential energy of generating various types of musical sounds because they produce tone signals electronically. In order to change tone signals in various manners, it is necessary to control tone signals in various modes.

In a keyboard type electronic musical instrument, various types of tone signals are controlled by using a key number KNo representing a tone pitch, an initial touch signal representing a key depression speed, an after-touch signal representing a depression force left after key depression, and other signals, respectively obtained when depressing keys on the keyboard.

Information obtained only from these signals has a limit. It has been desired to provide various other information in order to provide a wide range of such control.

For example, in playing rhythm instruments, conventional information is rather insufficient for giving a performance characteristic to rhythm instruments.

It is also difficult in many respects for a keyboard type electronic musical instrument to sequentially actuate keyboards keys in a portamento manner.

One example of an operator device for electronic musical instruments is described in Japanese Patent Publication No. 50-4144. This operator device has the structure that a coiled conductive member extending lengthwise is suspended slightly above an electric resistive body. The coiled conductive member and resistive body are supported between first and second support units facing each other and mounted being spaced from each other within a spring plate frame of a channel shape in section. In giving a musical performance, a finger is pushed against and moved along the coiled conductive member. The coiled conductive member pushed with the finger locally contact the resistive body, and the resistance value at the contact position controls the oscillation frequency of a variable frequency oscillator.

SUMMARY OF THE INVENTION

It is an object of the present invention to provide an electrical musical instrument capable of giving various types of performance such as rhythm instruments with easy operations.

It is another object of the present invention to provide an electronic musical instrument of a novel structure suitable for generating desired control signals.

It is a further object of the present invention to provide an electronic musical instrument with a novel performance operator.

According to one aspect of the present invention, there is provided an electronic musical instrument comprising: operator means having a predetermined operation length in a predetermined operation direction, for detecting at least one of access, contact, and push of an operating member, and generating a plurality of signals detected within the range of the operation length; time interval means for receiving the signals detected by the operator means and generating a time interval signal representing a time difference between consecutively detected signals; and tone signal synthesizing means for generating a tone signal in accordance with said detected signal and said time interval signal each time the operator means generates the detected signal.

Use of the operator means capable of being sequentially operated and generating a plurality of signals detected within the range of the operation length, allows performance operating means such as a stick to generate a plurality of signals to be detected upon one manipulation of the performance operating means and to generate the time interval signal representing a time difference between detected signals.

Use of the time interval signal allows various modifications of tone signals and an easy operation of generating musical sounds sequentially.

If a plurality of pads are used in combination with the operator means capable of being sequentially operated and generating a plurality of signals detected within the range of the operation length, the number of various types of musical sounds capable of being produced can be further increased.

Use of the scraper operator sequentially generating signals corresponding to the positions of the operating member such as a stick and finger operated within a predetermined performance range, allows musical tones to be generated by the electronic musical instrument to be controlled by the detected signals in various manners.

By detecting a time interval between consecutively detected signals, it is possible to provide an electronic musical instrument capable of novel controls of tone signals.

It is possible to control the pitch, tone color, volume, and the like of a tone signal to be generated, in accordance with a speed or acceleration of the scraper operator relative to the operator means.

According to another aspect of the present invention, there is provided an operator device for an electronic musical instrument comprising a movable operator member generally of a rectangular solid having a base unit and a free end with a movable contact formed thereon, wherein three hinged areas are formed at the back and both sides of the base unit.

Even if force is applied to the movable operator member in the direction inclining the member sideways while rubbing a stick or the like over the surface of the member, the force will not be concentrated upon the hinged area at the back of the member, because there are provide the two other hinged areas on both sides of the movable operator member.

According to another aspect of the present invention, there is provided an operator device for an electronic musical instrument, comprising an operator unit of a rectangular shape in plan to be operated by a player, an actuator unit of an arc shape in section mounted on the bottom surface of the operator unit, a movable contact of conductive material formed on the bottom surface of the actuator unit, a fixed contact disposed under the movable contact and facing the movable contact, and a support unit for supporting the operator unit so as to hold the movable contact over the fixed contact at the position spaced apart from the fixed contact.

It is preferable to integrally form the operator unit, actuator unit, movable contact, and support unit, in the lateral direction of the operator device, by using elastic material by means of extrusion molding.

As the operation surface of the operator unit is rubbed by a stick or the like, the operator unit is locally deformed at the area in contact with the stick because of the pushing force of the stick. Therefore, the movable contact becomes in contact with the fixed contact to turn on the switch constituted by the movable and fixed contacts. When the stick is moved away from the operator unit, the operator unit restores the original shape because of its elasticity, to thereby turn off the switch.

BRIEF DESCRIPTION OF THE DRAWINGS

FIG. 5A is a flow chart shown a scraper assign on-event process, and FIG. 5B is a table showing the contents of a scraper assign memory.

FIGS. 8A to 8E are diagrams explaining the switching operation between performance modes of the electronic musical instrument. FIG. 8A is a flow chart showing the mode switching process. FIGS. 8B to 8D are tables used for designating a mode, and FIG. 8E is a flow chart showing the control operation of selecting a mode.

FIG. 9A is a flow chart showing the acceleration data generating process, FIG. 9B is a graph showing an example of a change in acceleration, and FIG. 9C is a diagram explaining an example of notes of sounds generated by using acceleration data.

FIG. 10A is a flow chart explaining the tone color control which uses direction data, FIGS. 10B to 10D are conceptual diagrams explaining examples of changing tone colors by using direction data.

FIG. 11A is a flow chart explaining the control which uses direction-modified acceleration data, and FIG. 11B is a graph explaining examples of tone signals controlled by using direction-modified acceleration data.

DETAILED DESCRIPTION OF THE PREFERRED EMBODIMENTS

Figure 1:
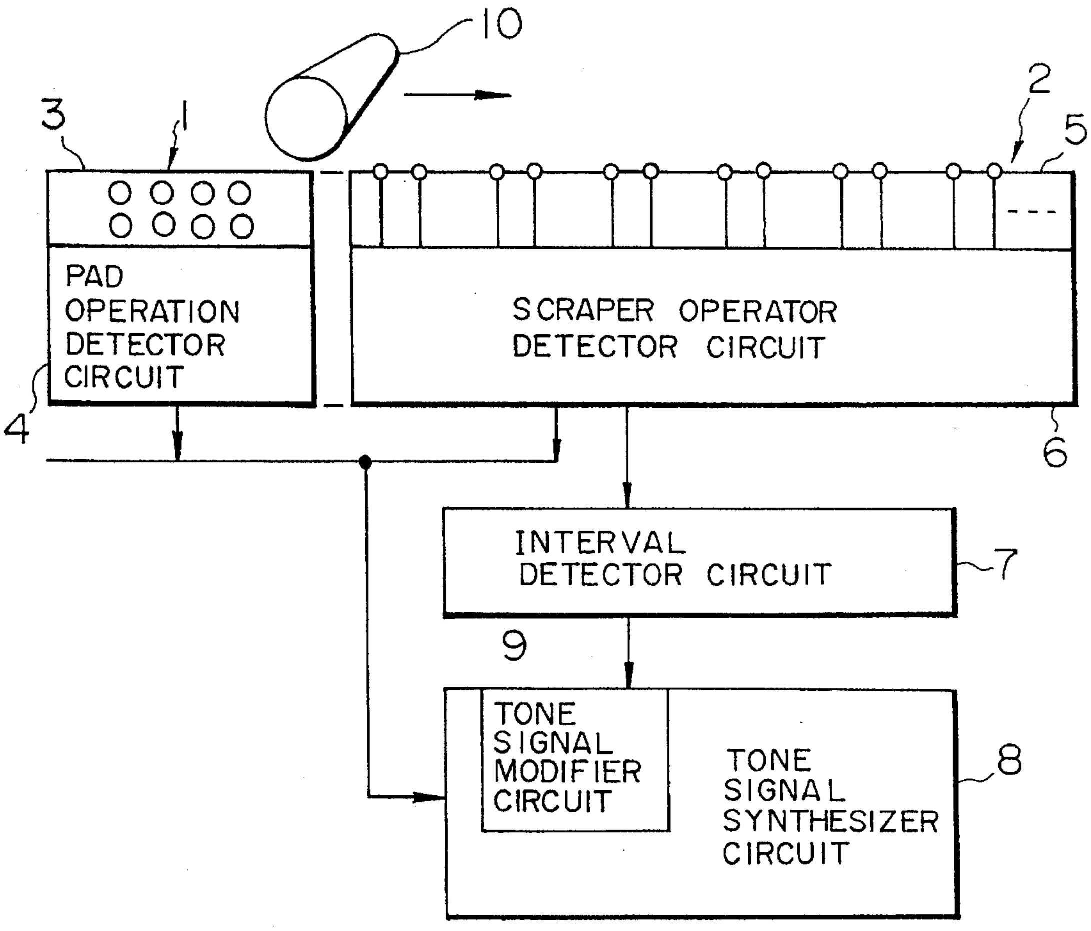
FIG. 1 is a block diagram showing the fundamental structure of an electronic musical instrument according to an embodiment of the present invention.

FIG. 1 is a block diagram showing the basic structure of an electronic musical instrument according to an embodiment of the present invention. A pad performance means 1 and scraper performance means 2 are juxtaposed on the main frame of an electronic musical instrument. The pad performance means 1 has a plurality of pad operators 3 and a pad operation detector circuit 4. The scraper performance means 2 has a scraper operator 5 and a scraper operation detector circuit 6. The scraper operator 5 can provide a continuous musical performance within the range of a predetermined operating length while generating a plurality of signals to be detected.

The scraper operator 5 is constructed of a number of switches. A tool 10 such as a stick is slid on the scraper operator 5 to continuously generate a number of signals to be detected. The tool 10 has the structure suitable also for hitting each of the pad operators 3. When the pad operator 3 is hit with the tool 10, a musical tone specific to the pad operator is generated.

Signals detected by the pad performance means 1 and scraper performance means 2 are supplied to a tone signal synthesizer 8 to generate tone signals. For example, the pad performance means is assigned a main rhythm instrument, and the scraper performance means is assigned a supplemental musical instrument or instruments. While playing a rhythm performance by hitting the pad performance means 1 of the main rhythm instrument, a series of tones of the supplemental musical instruments can be added to the rhythm performance by rubbing over the surface of the scraper performance means at any desired time.

Signals detected by the scraper performance means 2 are also supplied to an interval detector circuit 7 which generates a time interval signal representing the time interval between detected signals. The time interval signal is supplied to a tone signal modifier circuit 9 provided in the tone signal synthesizer.

The tone signal modifier circuit 9 modifies a tone signal to be generated, in accordance with the time interval signal supplied from the time interval detector circuit 7.

Signals detected by the scraper performance means 2 may be used in combination with signals from the pad performance means 1 as described above and other performance means, to generated independent tone signals. Such signals may also be used to modify a tone signal in accordance with control signals supplied from the pad performance means, scraper performance means, and other performance means.

For example, each switch of the scraper performance means 2 may be assigned a different predetermined musical instrument. In this case, when adjacent switches are sequentially operated, a musical instrument assigned to a certain switch is designated, and at least one of the volume, pitch, and tone color of a tone signal to be generated is modified in accordance with the time interval signal.

The scraper performance means 2 may be used for modifying a tone signal in accordance with the detected direction of moving the tool 10. It is also possible for the scraper performance means 2 to control the modification of a tone signal depending upon an acceleration of moving the tool 10, by detecting a change between time interval signals.

As above, musical sounds particularly rhythm sounds rich in variations can be provided by applying the scraper performance means to rhythm instruments.

Figure 2:
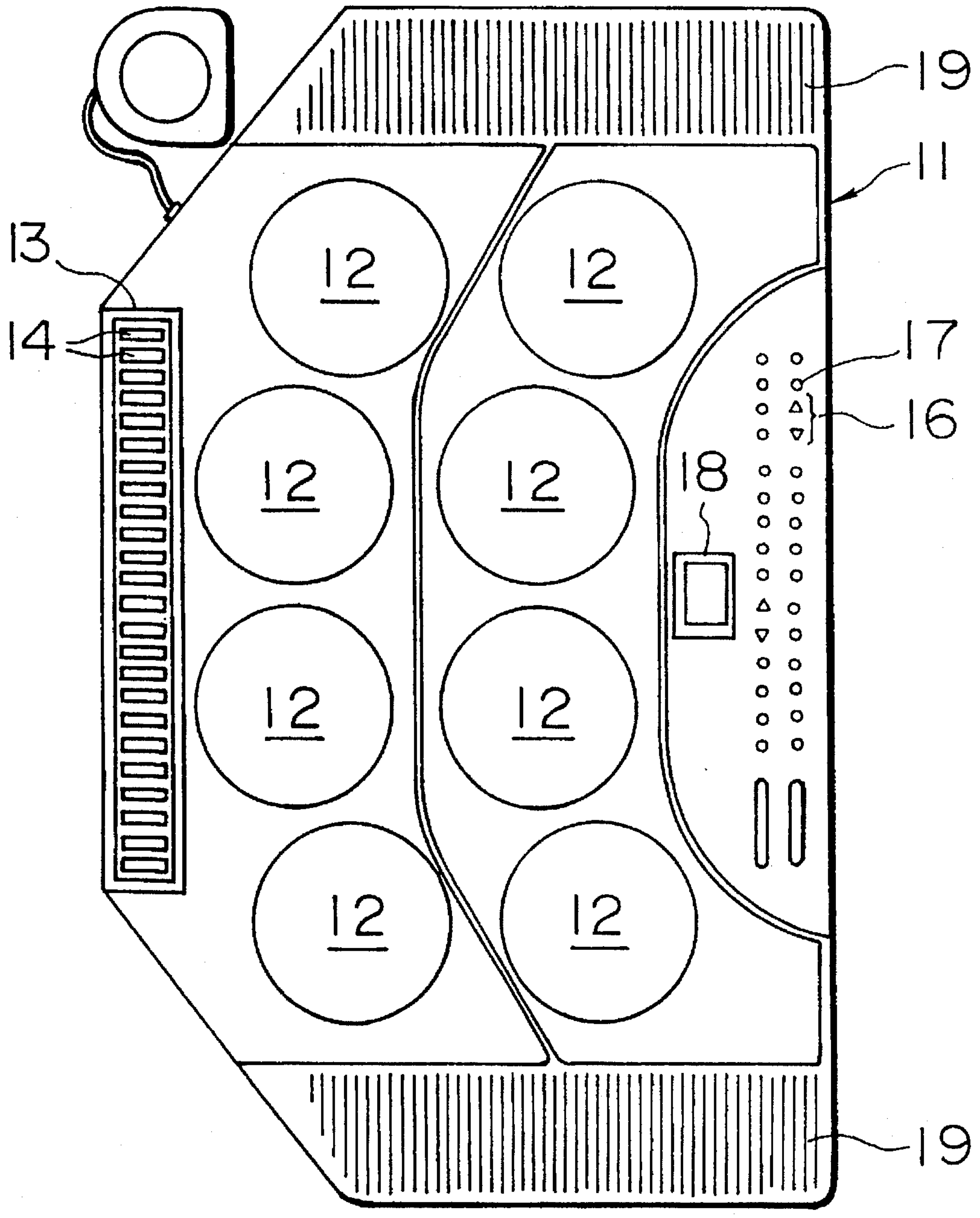
FIG. 2 is a plan view showing an example of the detailed structure realizing the structure shown in FIG. 1.

FIG. 2 shows an example of the structure realizing the basic structure shown in FIG. 1.

A scraper type electronic musical instrument 11 has eight pads 12 mounted on the central area of the instrument. Musical tones of a drum, tom-tom, bongo, or the like can be generated by hitting the corresponding pad with a stick or the like. A scraper operator 13 is mounted on the instrument above the pads 12, the scraper operator having a number of switches 14 arranged side by side in a line. As a stick or the like rubs over the surface of the scraper operator 13, the switches 14 are sequentially closed to generate corresponding signals to be detected.

Various control switches, buttons, a display 18, and the like are mounted on the instrument under the pads 12. Pad assign buttons 16 are used for designating a musical tone to be assigned to each pad. Scraper assign buttons are used for designating the function of the scraper operator 13.

In the example shown in FIG. 2, the display 18 has two 7-segment display units, and displays a mode or the like designated in a performance selecting mode or the like. Loud speakers 19 are mounted on opposite sides of the pads 12, for producing musical tones designated by pad performance means, scraper performance means, and other performance means. The above-described components are integrally mounted on the main body of the electronic musical instrument.

Figure 3:
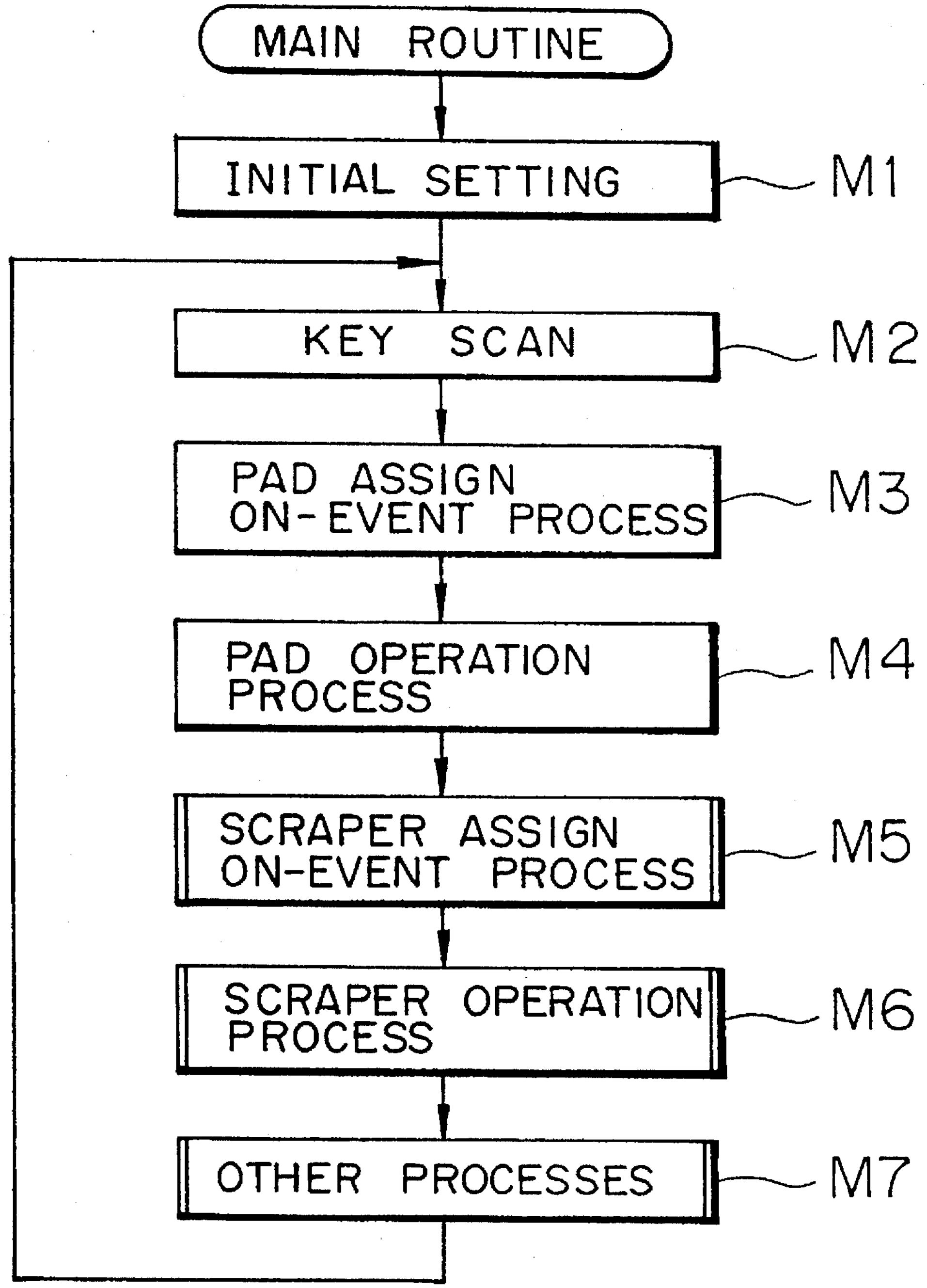
FIG. 3 is a flow chart showing the main routine of generating musical sounds of the electronic musical instrument.

FIG. 3 is a flow chart showing the main routine of a musical tone generation and control operation to be executed by the instrument shown in FIG. 2. When the main routine flow starts, various registers to be described later are initialized at step M1 to allow the instrument to be played.

Next, at step M2, keys of the instrument are scanned. These keys include the pads, switches of the scraper operator, pad assigned buttons 16, scraper assign buttons 17, and other switches and buttons.

At step M3, a pad assign on-event is processed. When a pad assign button 16 is operated, a process of designating the corresponding function of the operated button is executed.

Next, at step M4, a pad operation process is executed. Namely, when a pad 12 is operated and played, corresponding musical tones are generated. For example, in one mode, the pads are assigned bass drums BD, with their pitches set as C, D, E, G, G, A, B, and C. When a pad is hit with a stick, a musical tone having a tone color of a bass drum can be generated at the corresponding pitch.

At step M5, a scraper assign on-event is processed. Namely, when a scraper assign button 17 is operated, the scraper function corresponding to the operated button is set.

At step M6, a scraper operation process is executed. Namely, in accordance with the function set by the scraper assign on-event process, musical tones are generated or modified in response to the operation of the scraper operator.

At step M7, other processes are executed, such as tone color setting, mode switching, and automatic musical performance.

Figure 4A:
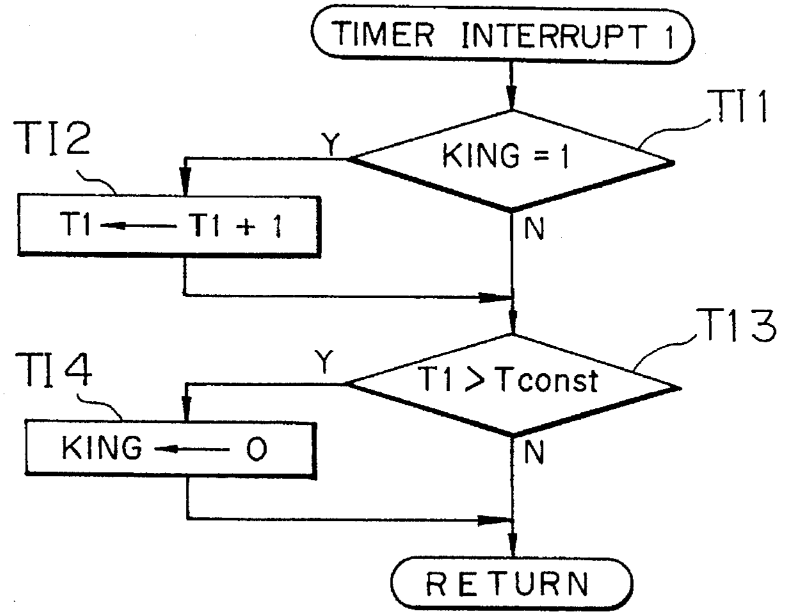
FIGS. 4A and 4B are flow charts showing timer interrupt routines.
Figure 4B:
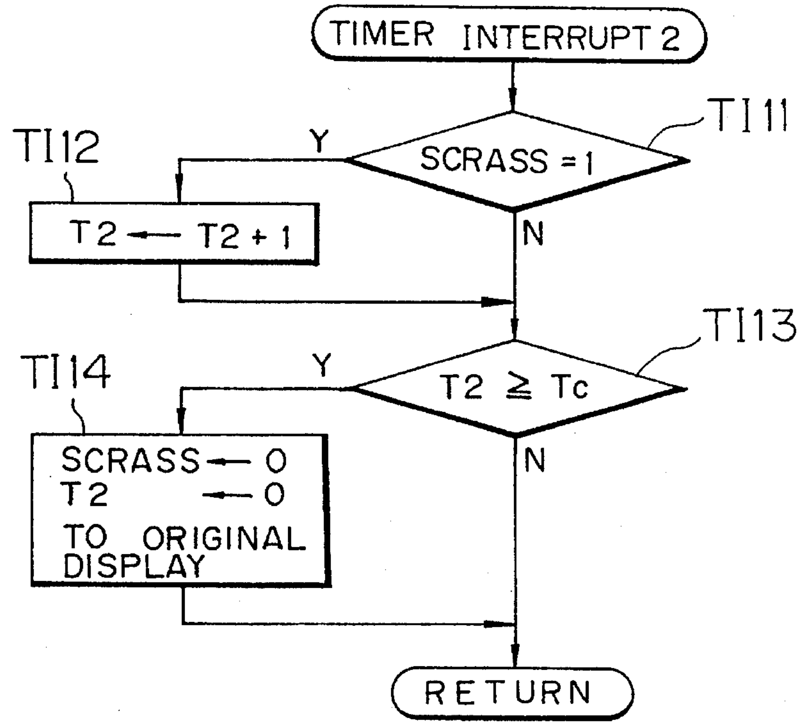

FIGS. 4A and 4B show time interrupt routines which are initiated in response to a designation signal generated at a predetermined time interval during the execution of the main routine.

FIG. 4A shows a timer interrupt routine 1. This timer interrupt routine is used for generating the time interval signal representing a time interval between detected signals of adjacent switches of the scraper operator 13 under operation.

At step TI1 it is checked whether a flag KING is 1 or not. The flag KING indicates the activation of the scraper operator, and is set to "1" when a switch 14 is closed when the operating member such as a stick contacts the scraper operator.

If KING is 1 representing the scraper activation, the flow follows an arrow Y to advance to step TI2 whereat the content of a timer register T1 is incremented by 1. As this flow is repeated, the content of the timer register T1 increases.

Next, at step TI3 it is checked whether the content of the timer register T1 exceeds a predetermined constant Tconst. The constant Tconst is an arbitrary value within the range of about 0.2 to 1 sec.

If the content of the timer register T1 exceeds the constant Tconst, the flow follows an arrow Y to advance to step TI4 whereat the flag KING is set to "0". Thereafter, the flow returns to the main routine. If T1 is not over the constant Tconst, the flow follows an arrow N and returns to the main routine.

If the content of the flag KING is not 1 (i.e., 0) at step TI1, the step TI2 is bypassed.

As the performance operating member such as a stick rubs over the surface of the scraper operator 13, a corresponding plurality of switches 14 are closed and opened. When the first switch is closed, the flag KING is set to 1 to start the timer register T1 to count up its content. The timer register T1 counts the time from when the first switch is closed to when the next switch is closed. When the next switch is closed, the time interval signal is generated.

If the time from when the first switch is closed to when the next switch is closed, becomes longer than the predetermined time Tconst, the judgement at step TI3 is YES. In this case, it is judged as an abnormal performance type, and the flag KING is reset to 0 at step TI4.

FIG. 4B shows a timer interrupt routine 2. When a scraper assign button 17 shown in FIG. 2 is operated, a flag SCRASS is set to 1. When the scraper assign button 17 is operated again, the scraper function is changed.

At step TI11, it is checked whether the flag SCRASS is 1 or not. At the second operation of the scraper assign button 17, the flow follows an arrow Y to advance to step TI12 because the flag SCRASS has been set to 1. If the flag SCRASS is not 1, the flow follows an arrow N to bypass the step TI12.

At step TI13, it is checked whether the content of a timer register T2 has reached a predetermined value Tc. If the content of the timer register T2 becomes equal to or larger than the predetermined value Tc, it is judged that the scraper assign operation is not a predetermined type, and the flow follows an arrow Y to advance to step TI14 whereat the flag SCRASS is reset to 0, the content of the timer register T2 is set to 0, and the display content resumes the original one.

If the content of the timer register T2 has not reached the predetermined value Tc, the flow follows an arrow N to bypass the step TI14. If the scraper assign button 17 is not operated, T2 remains 0. If the button 17 is operated only once, T2 gradually increases, and it finally becomes 0 at step TI14.

The predetermined value Tc is set to an arbitrary value within the range of about 1 to 3 sec.

When the scraper assign button 17 is operated twice or more, this timer interrupt routine sets a new scraper function. If the scraper assign button 17 is operated once and the second operation is not effected within the predetermined time, it is judged that the scraper assign operation is not a predetermined one, and the scraper function is not set.

Figures 5A, 5B:
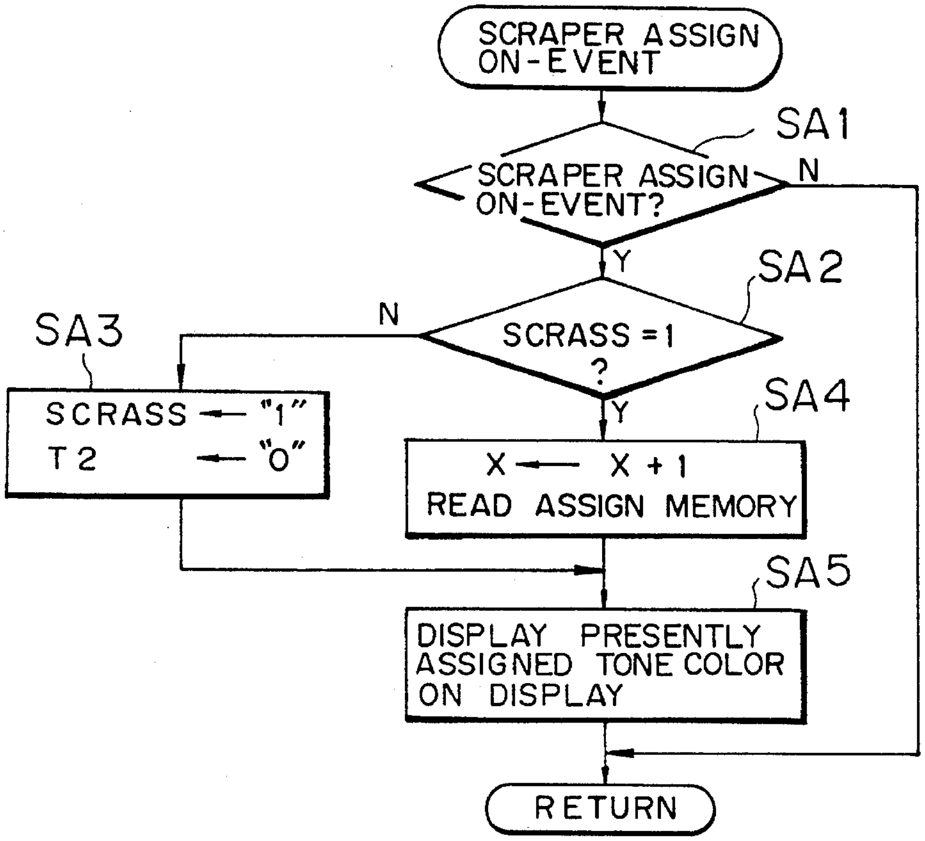
FIGS. 5A and 5B are diagrams explaining how to set the scraper function.

FIGS. 5A and 5B illustrate settings of the scraper function by using the scraper assign button.

FIG. 5A is a flow chart showing a scraper assign on-event process.

When the process starts, it is judged at step SA1 whether there is a scraper assign on-event. When a scraper assign button is operated, an on-event issues and the flow follows an arrow Y to advance to step SA2. If the scraper assign button is not operated, there occurs no on-event and the flow follows an arrow N to immediately return to the main flow.

At step SA2, it is checked whether a flag SCRASS is 1 or not. When the scraper assign button is operated first time, the flow follows an arrow N to advance to step SA3 because the flag SCRASS is 0. At step SA3, the flag SCRASS is set to 1 and the content of the timer register T2 is set to 0.

When the scraper assign button 17 is operated twice or more, the flow follows an arrow Y to advance to step SA4 because the flag SCRASS is 1. At step SA4, the content of a register X is incremented by 1 and the contents of a scraper assign memory corresponding to the content of the register X are read. If the content of the register X after the increment by 1 is equal to or larger than a predetermined value (16 in this embodiment), X is set to 0. After the steps SA3 and SA4, a tone color name presently assigned is displayed on the display at step SA5.

FIG. 5B shows the contents of the scraper assign memory. X is a variable for designating a scraper assign mode. n is the number of each switch of the scraper operator. TBLASS (n) represents a tone color assigned to the n-th switch of the scraper operator.

In a bass drum assign mode of X=0, each switch of the scraper operator 13 is assigned the same bass drum BD. Similarly, in a tom-tom assign mode of X=1, each switch of the scraper operator 13 is assigned the same tom-tom TOM. In a conga assign mode of X=2 and in a bongo I assign mode of X=3, each switch of the scraper operator is assigned the same conga and bongo, respectively.

In a bongo II assign mode of X=4, each switch of the scraper operator is assigned a semitone of a bongo corresponding to two octaves from C1 to B3. In the operation to be described below, the same musical one is preferably assigned to two switches mounted at an end of the scraper operator, in the case of a performance style wherein musical tones are generated only after the second switch is closed. In a marimba assign mode of X=6, each switch of the scraper operator is assigned a semitone of a bongo corresponding to two octaves from C3 to B4, like the bongo II assign mode.

In a MIX assign mode of X=15, each switch of the scraper operator 13 is assigned a standard musical tone of each of various sound sources.

For example, in a performance style where the pads are assigned tones of a bass drum having pitches C, D, E, G, G, A, B, and C, musical sounds other than bass drum sounds cannot be produced if the scraper operator is not provided. If the scraper operator is assigned, for example, a high-hat cymbal HH assign mode, high-hat cymbal sounds can be produced by operating the scraper operator at good timings during the bass drum performance.

If the scraper operator is assigned, for example, the MIX assign mode, musical tones of all designated sound sources can be added at a short time interval by rubbing over the surface of the scraper operator at good timings during the bass drum performance. In this case, a function of sound effects can be provided.

In one performance style, each switch of the scraper operator may used only for generating a time interval signal so that the musical tone designated by the pad can be modified using this time interval signal.

Even if the musical tone of a single instrument is assigned to the scraper operator, musical tones can be changed in various ways by selecting the scraper performance mode using the time interval to be described later. In the following, the performance mode applicable to the instrument with the structure as shown in FIG. 2 will be detailed.

Figure 6:
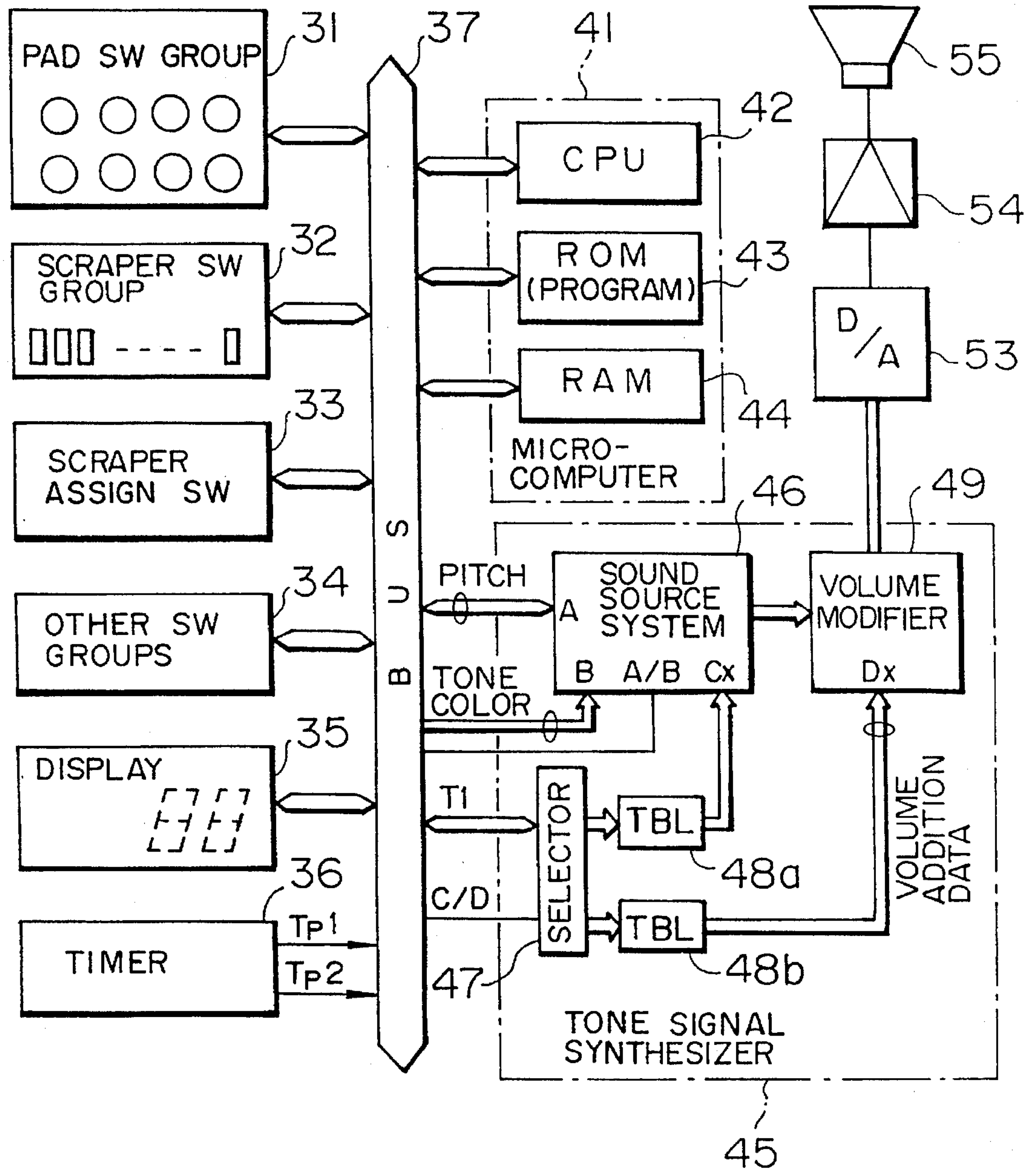
FIG. 6 is a block diagram showing an example of a system arrangement of the electronic musical instrument.

FIG. 6 is a block diagram showing the system configuration of an electronic musical instrument. A pad switch group 31 includes, for example, eight pads. When each pad is hit, a corresponding switch is closed.

A scraper switch group 32 includes, for example, sixteen or twenty four switches mounted on a scraper operator. As a suitable performance operating member such as a stick rubs the surface of the scraper operator, corresponding switches are closed. A scraper assign switch 33 is a switch for assigning the scraper function by sequentially pressing it twice or more, for example, as described previously.

Another switch group 32 includes other control switches such as a pad assign switch, tone color designating switch, mode selecting switch, automatic performance switch, and the like. A display 35 is constructed of two 7-segment liquid crystal display units. A timer circuit 36 has at least two timer registers for generating timer interrupt signals Tp1 and Tp2 for activating the timer interrupt routines 1 and 2 at predetermined timings.

These components are connected to a bus 37 for data transfer therebetween. Also connected to the bus 37 are a CPU 42, ROM 43, and RAM 44, respectively of a microcomputer 41.

CPU 42 performs a tone signal synthesizing process in accordance with a program stored in ROM 43. Variables and the like used during the tone signal synthesizing process are loaded in registers in RAM 44. ROM 43 stores also various parameters for tone signal synthesizing and other various tables.

A tone signal synthesizing means 45 is connected to the bus 37. The tone signal synthesizing means 45 includes a sound source system 46, selector 47, tables 48, sound volume modifier circuit 49, and other necessary elements. A signal representing a pitch is supplied via a port A from the bus 37 to the sound source system 46, a signal representing a tone color is supplied via a port B, and a discrimination signal for discriminating between the pitch and tone color to be modified is supplied via a port A/B. A control signal representing whether a modification is to be executed to what degree is supplied via a port Cx. In accordance with instructions from CPU 42, musical tones are produced in response to the operations of the pad switch group 31 and scraper switch group 32.

The selector 47 receives the content of the timer register T1 and a control signal C/D supplied from the bus 37, and the selected signals are supplied to tables 48*a* and 48*b*. The content of the timer register T1 is a time interval between times when adjacent switches 14 of the scraper operator 13 are operated upon. The tables 48*a* and 48*b* read control signals corresponding to the timer interval signal, and supplies them to the sound source system 46 and sound volume modifier circuit 49.

The control signal supplied from the table 48*a* is used for the control of a pitch or tone color, and the control signal supplied from the table 48*b* is used for the control of a sound volume.

The sound volume modifier circuit 49 controls the sound volume of a tone signal supplied from the sound source system 46, in accordance with sound volume addition data (representing whether a sound volume modification is to be executed to what degree) supplied from the table 48*b* via an input port Dx. An output signal with its volume modified by the sound volume modifier circuit 49 is supplied to a digital-analog converter (D/A) 53 and converted into an analog signal which is then supplied via an amplifier 54 to a loud speaker 55 to generate musical sounds. The contents of the control operation will be further described in detail.

Figure 7:
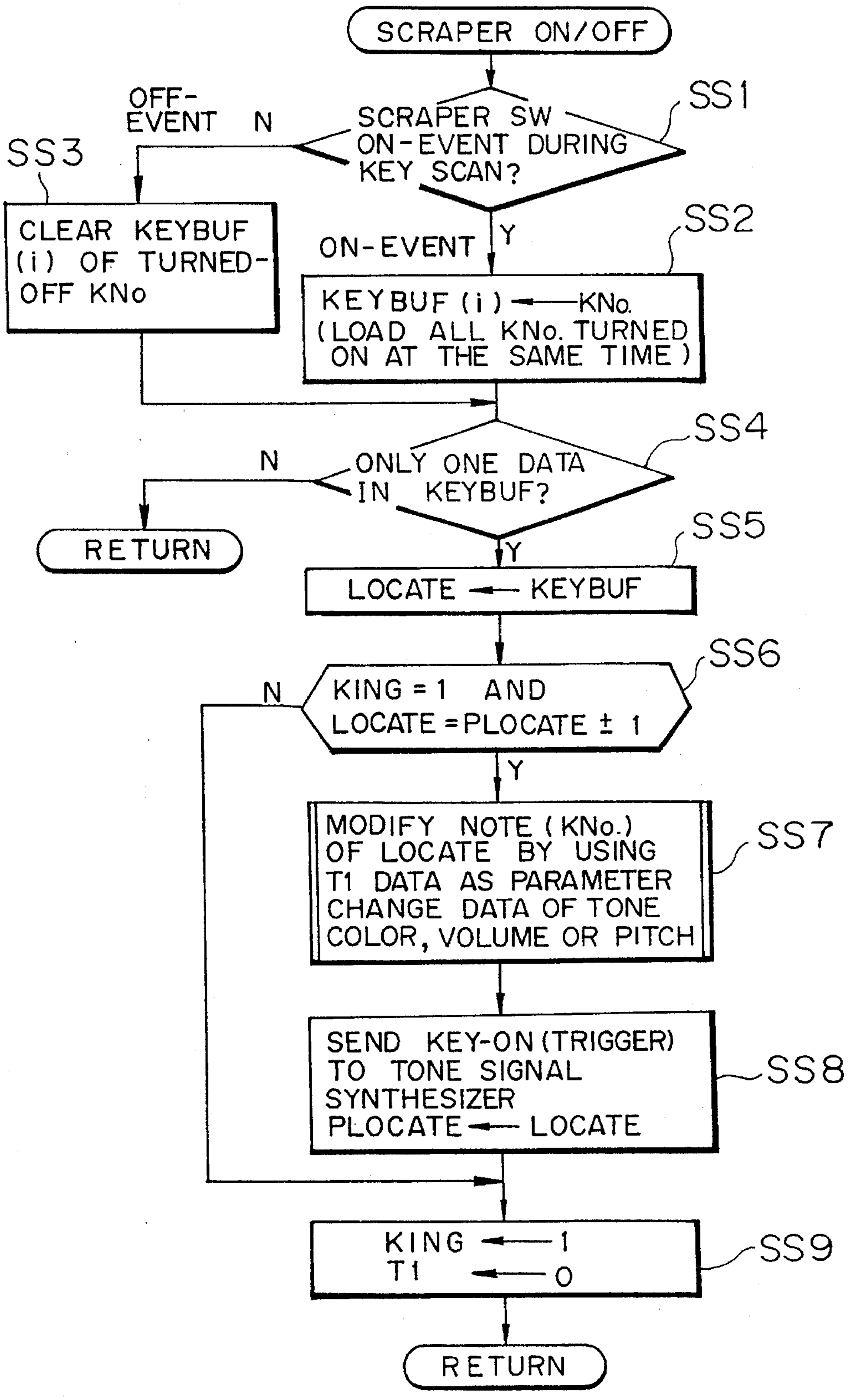
FIG. 7 is a flow chart showing a scraper on/off-event process.

FIG. 7 is a flow chart showing an on/off-event process for a scraper switch. At the key scan step M2 of the main routine shown in FIG. 3, each scraper switch is scanned to detect on-switch and off-switch.

When a scraper switch event is detected, the scraper switch on/off-event routine shown in FIG. 7 starts. If no event is detected, this routine is bypassed. When this routine starts, it is checked at step SS1 whether the detected scraper switch event is an on-event or off-event.

In the case of an on-event, the flow follows an arrow Y to advance to step SS2 whereat the key number KNo of an on-switch is loaded in a key buffer register KEYBUF (i). If a plurality of scraper switches are turned on simultaneously, all corresponding key numbers are loaded in the key buffer registers KEYBUF (i).

Next, at step SS4, it is checked whether the register KEYBUF has only one data. Namely, if then umber of simultaneously turned-on scraper switches whose numbers were loaded in the register, is two or more, the judgement at step SS4 is NO and the flow follows an arrow N to immediately return to the main routine.

If only one scraper switch of the scraper operator is being turned on, the flow follows an arrow Y to advance to step SS5 whereat the content of the key buffer register KEYBUF is loaded in a register LOCATE.

It is checked at the next step SS6 whether the flag KING representing the activation state of the scraper operator is 1, and whether the position of the presently turned-on switch indicated by the register LOCATE is next to the position of the past turned-on switch indicated by a register PLOCATE. If the presently turned-on key is next to the past turned-on switch, the contents of both the registers LOCATE and PLOCATE show a difference of 1, and the judgement is YES.

If the adjacent switches of the scraper operator are sequentially turned on, the flow follows an arrow Y to advance to step SS7 whereat the data in the timer register T1 representing the time interval is employed, as parameter change data of tone color, sound volume, or pitch, to modify the note number KNo in the register LOCATE. Namely, the parameter change data is generated, or the parameter change data is generated and sent to the tone signal synthesizer means.

At the next step SS8, the key number, the contents of the scraper assign memory corresponding to the content of the register X, predetermined tone synthesizing parameters, key-on (trigger) signal, and the like are supplied to the tone signal synthesizer means, to generate a tone signal modified by the time interval and corresponding to the present key-on position. The content of the register LOCATE representing the present key-on position is supplied to the register PLOCATE representing the past key-on position to update the content of the register PLOCATE.

If the switch of the scraper operator operated next is not adjacent to the past operated switch at step SS6, the flow follows an arrow N to bypass the steps SS7 and SS8. Namely, even if the stick is once moved away from the scraper operator and it is again placed on a switch other than the next switch, no sound is generated.

At step SS9, 1 is set to the flag KING representing the activation of the scraper operator, and 0 is set to the timer register representing the time interval. As a result, in the case where three or more switches are sequentially turned on, the above operations are repeated for the third and following switches.

If there is no on-event at step SS1, the flow follows an arrow N to advance to step SS3 whereat an off-even process is executed. Namely, if there is a turned-off switch, the key buffer register KEYBUF (i) loaded with the note number KNo of the switch is cleared.

In the scraper switch on/off-even process routine shown in FIG. 7, the performance on the scraper operator is reflected on the modification of a musical sound to be generated, by the detected time interval between times when adjacent scraper switches are operated sequentially. Various modification modes are possible, some of which are described below.

FIGS. 8A to 8E illustrate a first modification mode. FIG. 8A is a flow chart showing a mode switching process routine for switching between modes which determine the parameter to be controlled, in accordance with the time interval signal.

When this process starts, it is checked at step MX1 whether there is an on-event of the mode selecting switch. If there is no on-event, the flow follows an arrow N to immediately return to the main routine.

If there is an on-event, the flow follows an arrow Y to advance to step MX2 whereat the content of a mode register MD is incremented by 1. At the next step MX3, it is checked whether the content of the mode register is 7 is not. If not 7, the flow immediately returns. If 7, the flow advances to step MX4 whereat the content of the mode register MD is reset to 0.

In the above manner, as the mode selecting switch is sequentially operated, the mode MD sequentially changes from 0 to 6. After the mode 6, the mode 0 is selected. In accordance with each selected mode, CPU 42 shown in FIG. 6 supplies corresponding control signals A/B and C/D.

FIG. 8B shows the contents of the control signal A/B, the control signal A/B of 0 means the modification of pitch, and the control signal A/B of 1 means the modification of tone color.

FIG. 8C shows the contents of the control signal C/D. The control signal C/D is a 2-bit signal. The upper bit C indicates whether the pitch or tone color control is executed, and the lower bit D indicates whether the volume control is executed. If C=1, the pitch or tone color is controlled. If D=1, the volume control is executed.

FIG. 8D is a table showing how the control signals A/B and C/D are set and which tone signal parameter is modified, for each modification mode MD. If the mode MD=0, the control signal A/B is set to 0, and the control signal C/D is set to 10. In this case, although C=1 indicates that the pitch or tone color is to be controlled, A/B=0 indicates that the pitch is used as the parameter to be modified.

For the mode MD=1, A/B=0 and C/D=01. The pitch and tone color are not modified as indicated by C=0, and the volume is controlled as indicated by D=1.

For the mode MD=2, A/B=0 and C/D=11. The pitch or tone color, and volume are controlled as indicated by C=1 and D=1. Of the pitch and tone color, the former is modified as indicated by A/B=0.

Similarly, for the modes MD=3 to 5, the control signals A/B and C/D are set as shown to modify the tone color, volume, and tone color and volume, respectively for each mode. For the mode MD=6, the control signal C/D is 00 and the tone signal synthesizer means 45 shown in FIG. 6 does not execute the tone signal modifying control. In this case, upon the operation of the scraper operator, musical tones set by the tone color are generated.

If X=15 (MIX) is set in the scraper assign mode shown in FIG. 5B, various sound sources are assigned to the switches of the scraper operator, so that when each switch of the scraper operator is activated, a corresponding tone signal is generated.

In the above description, one of the pitch and tone color is selectively modified. Instead, both the pitch and tone color may be modified.

FIG. 8E is a flow chart of a sub-routine showing which type of control is executed at step SS7 shown in FIG. 7, in accordance with the mode signal MD shown in FIG. 8D. When step SS7 starts, the mode is set at step X1 in accordance with the mode signal MD.

In the case of mode MD=0, the flow advances to step X2 whereat the content of the timer register T1 is sent to the tone signal synthesizer means to reflect the content of T1 upon the note number KNo of the register LOCATE, as the pitch modifying data.

In the case of the modes MD=1 or 4, the flow advances to step X3 whereat the content of the timer register T1 is sent to the tone signal synthesizer means to reflect the content of T1 upon the note number KNo of the register LOCATE, as the volume modifying data.

In the case of the mode MD=2, the flow advances to step X4 whereat the content of the timer register T1 is sent to the tone signal synthesizer means to reflect the content of T1 upon the note number KNo of the register LOCATE, as the pitch and volume modifying data.

After executing the process corresponding to the selected mode MD, the flow returns. In such a process, a rapid operation of the tool such as a stick over the surface of the scraper operator corresponds in an auditory sense to a strong modification. For this reason, the shorter the time interval, it is preferable to give the stronger modification.

The intensity of such modification can be adjusted by using output signals from the tables 48_a_ and 48_b_ shown in FIG. 6, the output signals having values inversely proportional to the time interval T1 or other appropriate values.

In the above embodiment, used as a tone signal control parameter is the time interval between times when adjacent switches of the scraper operator are activated. The time interval is an inverse of the speed of performance, so that it means that the tone signal modification is executed in accordance with the performance speed.

Various other modes of modifying musical sounds to be generated are possible.

Figure 9A:
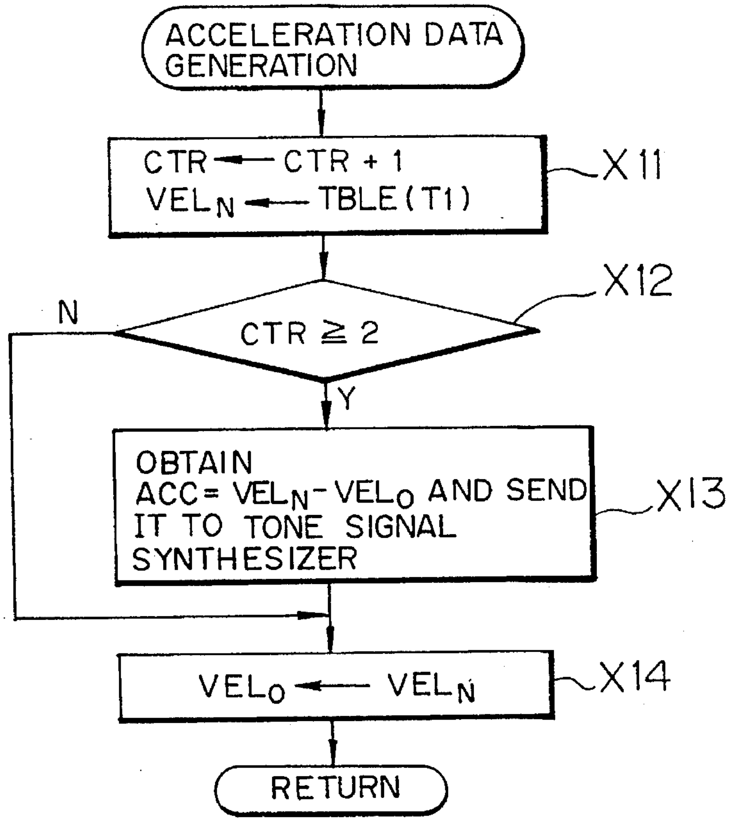
FIGS. 9A to 9C illustrate a mode which uses acceleration data.
Figure 9B:
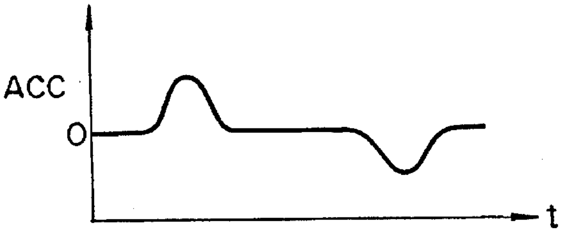
Figure 9C:
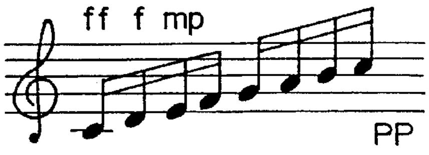

A second modification mode is illustrated in FIGS. 9A to 9C. In this mode illustrated in FIGS. 9A to 9C, tone signals to be generated are modified in accordance with a difference between time intervals, or acceleration, between on-events of pairs of adjacent switches of the scraper operator operated by a tool such as a stick or finger. In this case, in place of the time interval T1, an acceleration ACC is supplied to the tone signal synthesizer as a control parameter.

FIG. 9A is a flow chart showing the operation of generating acceleration data. When the process starts, at step X11 the content of a counter register CTR is incremented by 1. The counter register CTR takes three ranges of value, namely, 0, 1, and 2 or more. Referring to a conversion table TBLE in ROM 43, the time interval T1 is converted to speed data which is set to a speed register $VEL_N$.

Next, it is checked at step X12 whether the content of the counter register CTR is 2 or more. If the content of the counter register CTR is 1, only one speed data is present, being unable to calculate an acceleration. In this case, therefore, the flow follows an arrow N to advance to step X14 without calculating an acceleration.

If the content of the counter register CTR is 1 or more, the flow follows an arrow Y to advance to step X13 whereat an acceleration $ACC=VEL_N-VEL_o$ is obtained. This acceleration data ACC is sent as the control parameter to the tone signal synthesizer means.

At step X14, the content of the new speed register $VEL_N$ is set to the old speed register $VEL_o$ to thereafter return from the flow.

In this manner, the acceleration data generated as the control parameter is sent to the tone signal synthesizer means to control the tone signal to be generated, in accordance with the acceleration of performance on the scraper operator.

For example, consider the case where scale tone of a bongo, conga, tom-tom, or marimba is selected for the scraper operator. In this case, the fundamental tone designated by the position in the scraper operator can be modified, e.g. by reflecting an acceleration data ACC upon a fundamental pitch designating data.

The acceleration of a tool such as a stick operated by a player generally changes as shown in FIG. 9B. Specifically, at the initial stage of performance, the acceleration ACC gradually increases. After it reaches the maximum acceleration, it decreases, although the speed continues to increase, and changes to a constant speed performance. At the terminating stage of performance, a deceleration starts. The acceleration of speed reduction gradually increases (the absolute value gradually reduces). After it reaches the negative maximum acceleration, it starts reducing and finally disappears.

For example, consider the case wherein the same bongo sound is assigned to each switch of the scraper operator, by using the scraper assign switch. As the scraper operator is actuated, the acceleration ACC changes at the initial and terminating stages of performance as shown in FIG. 9B, providing the acceleration data. This data ACC is supplied to the sound source system 46 shown in FIG. 6 as the control data to change the pitch of a tone signal to be generated.

In this case, at the initial stage of performance, bongo sounds having slightly higher than the fundamental pitch are generated, thereafter bongo sounds having substantially the same pitch as the fundamental pitch are generated, and near at the terminating stage, bongo sounds slightly lower than the fundamental pitch are generated. The degree of pitch change traces the acceleration change.

When the acceleration is used as the control data, the first two switches of the scraper operator activated do not contribute to generating a tone signal. Therefore, three switches at an end portion of the scraper operator may be assigned the same tone color.

If the speed of performance is slow, an extremely slow performance may result in no sound generation if the timer register T1 is reset to cancel the operation of the scraper operator, like the embodiment described above.

The similar control may be applied not only to generating sounds of a bongo but also to generating sounds of a conga, gueiro, wooden drum, tree chime, or grating door. As a sound source, various types of sound sources are possible such as a waveform memory sound source and FM sound source.

In this embodiment, acceleration is detected from time interval between pairs of adjacent switches, and the acceleration data is used for controlling a tone signal to be generated. Three consecutively sampled time intervals may be averaged to use the average value as the tone signal control parameter.

In this embodiment, although the acceleration is used to control the pitch, it may be used to control other parameters such as sound volume. In controlling the sound volume, for example, by using the acceleration data such as shown in FIG. 9B, bongo sounds slightly greater than a predetermined volume are generated at the initial stage of performance, bongo sounds of a predetermined volume are thereafter generated, and near at the terminating stage, bongo sounds slightly lesser than the predetermined volume are generated.

It is also possible to control the sound volume in the bongo II mode. In this mode, each switch of the scraper operator is assigned a different pitch of a sound source. By adding the acceleration data to the sound source having pitches, sounds whose volume changes with pitch can be generated. Namely, as shown in FIG. 9C, it is possible to generated bongo sounds whose pitch gradually increases and whose volume gradually decreases.

The above-described control has been given for a bongo by way of example. Other tones with pitches, e.g., marimba, can be controlled in the same manner.

Figure 10A:
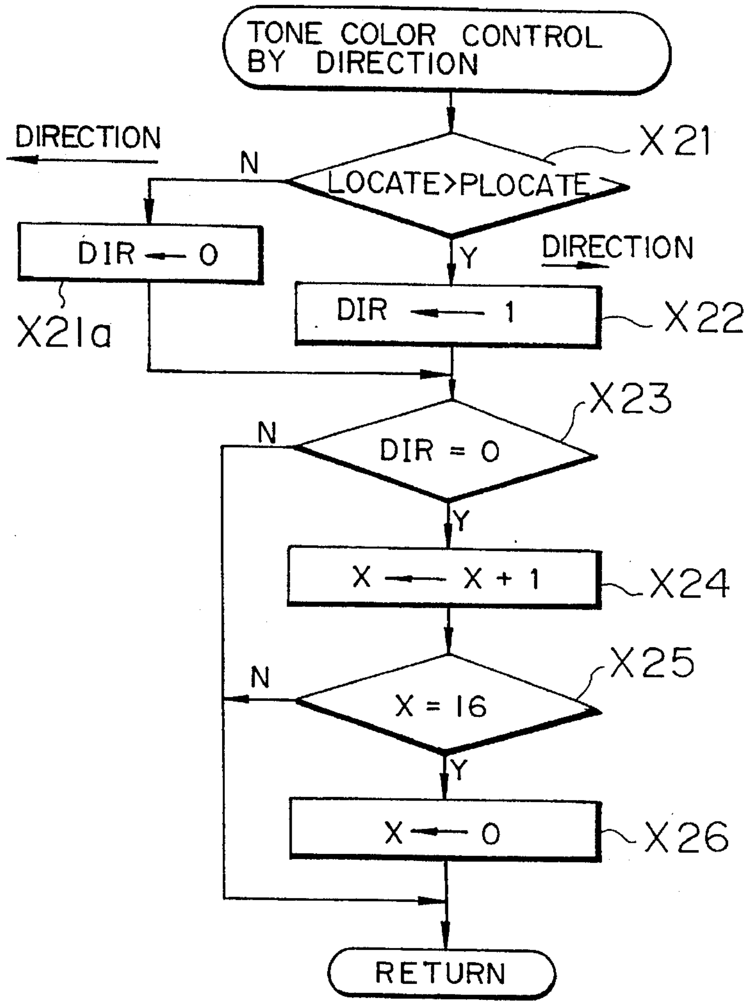
FIGS. 10A to 10D illustrate the tone color control which uses direction data.

It is also possible to provide a control whose content changes with the direction of manipulating a performance operating member or tool such as a stick, by discriminating the direction of manipulating a tool over the scraper operator. FIGS. 10A to 10D illustrate a third modification mode. FIG. 10A is a flow chart showing the control operation taking the direction of manipulation into account.

In FIG. 10A, when the process starts, it is checked at step X21 whether the position LOCATE of a presently turned-on switch is greater than the position PLOCATE of the past turned-on switch. The position on the scraper operator is assumed that the larger the key number, the more left-sided the position of a switch is.

If YES at step X21, it means the motion to the right, and the flow follows an arrow Y to advance to step X22 whereat 1 is set to a direction register DIR. If the motion to the left, the flow follows an arrow N to advance to step **X21*a*** whereat 0 is set to the direction register DIR.

At step X23, it is checked if the direction DIR=0. If the direction DIR=1 (motion to the right), the flow follows an arrow N to immediately return. If the motion is to the left, it means that DIR=0 and so the flow follows an arrow Y to advance to step X24 whereat the content of the register X designating the scraper assign mode is incremented by 1.

Next, at step X25, it is checked whether the register X is 16. In the embodiment, the tone color X has 16 types from 0 to 15 as shown in FIG. 5B. If X=16, the flow follows an arrow Y to advance to step X26 whereat the content of the register X is again set to 0. Thereafter, the flow returns. If the register X is not 16, the flow follows an arrow N to return.

With the above-described process, the content of the register X is incremented if the motion of manipulation on the scraper operator is in the left direction, and the content thereof is not changed if the motion is in the right direction. When the tone color is controlled in accordance with the tone color variable X, it will not change in the case of the right direction motion, and sounds sequentially changing its tone color are generated in the case of the left direction motion.

Figure 10B:
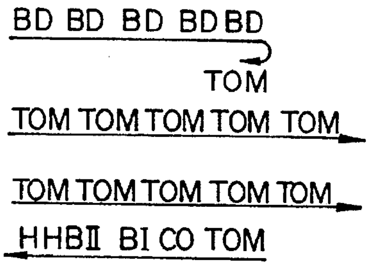

For example, as shown in FIG. 10B, if the scraper operator is activated first in the right direction, sounds of a bass drum are generated. Thereafter, when the scraper operator is activated in the reverse direction, the tone color changes to that of a tom-tom TOM. In this condition, if the stick or the like is manipulated in the right direction, sounds of the same tom-tom TOM are generated, and continue to be generated until the stick or the like is manipulated without changing to the left direction.

Next, the motion is reversed to the left direction, sounds are generated sequentially changing from the tom-tom TOM, conga CO, bongo I, bongo II, high-hat cymbal, and so on.

Figure 10C:
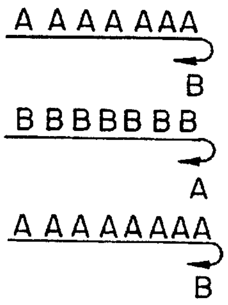
Figure 10D:

FIG. 10C illustrates the case where two types of tones are generated. For example, drum-based sounds A and cymbal-based sounds B.

While the motion of performance remains in the right direction, drum-based sounds A are generated. When the motion direction is reversed, cymbal-based sounds B are generated. When the motion direction is reversed again, drum-based sounds are generated. While the motion of performance continues to be remained in the left direction, drum-based sounds A and cymbal-based sounds B are alternately generated.

In the third modification mode, the variable X designating the scraper assign mode is sequentially changed in accordance with the direction of performance. The invention is not limited only to such settings. For example, the scraper operator may be assigned MIX (X=15) so that the tone color can be sequentially changed each time a switch is closed, irrespective of the key number of a depressed scraper switch.

Figure 11A:
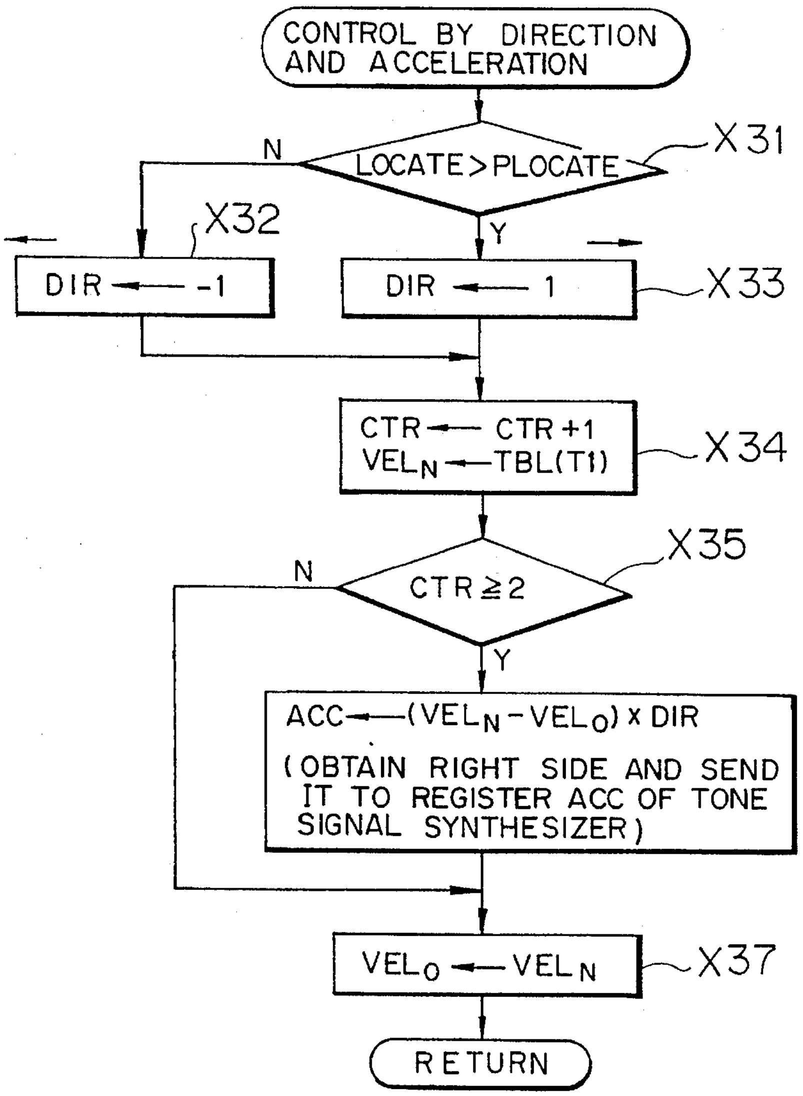
FIGS. 11A and 11B illustrate the control which uses both direction and acceleration data.
Figure 11B:
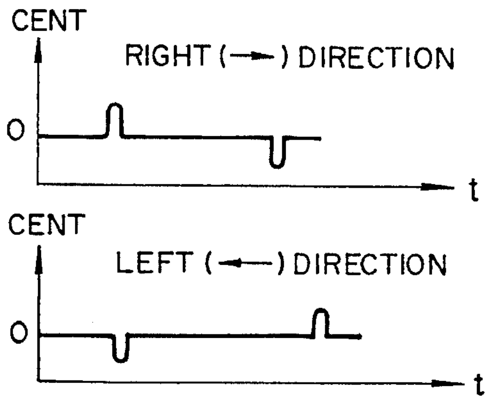

FIGS. 11A and 11B illustrate a fourth modification mode wherein a tone signal to be generated is controlled by using the direction data of performance on the scraper operator and the acceleration.

In FIG. 11A, when the process starts, it is first checked at step X31 whether the position LOCATE of a presently turned-on switch is greater than the location PLOCATE of the past turned-on switch, to judge the direction of performance.

If the motion is in the right direction, the flow follows an arrow Y to advance to step X33 whereat 1 is set to the direction register DIR. If the motion is in the left direction, the flow follows an arrow N to advance to step X32 whereat −1 is set to the direction register DIR.

Next, at step X34 the counter register CTR is incremented by 1, and the time interval T1 is converted to an inverse value by using the table to load the inverse value in the speed register $VEL_N$.

At step X35, it is checked whether the count of the counter register CTR is 2 or more. If the count register CRT=1, an acceleration cannot be calculated and so the flow follows an arrow N to bypass the step X36.

If the counter register CTR reaches 2, the flow follows an arrow Y to advance to step X36 whereat the past speed register value $VEL_o$ is subtracted from the present speed register value $VEL_N$ to obtain the acceleration data. The acceleration data is multiplied by the direction register value DIR to obtain the acceleration data modified by the direction. This modified acceleration data is loaded in the acceleration register ACC of the tone signal synthesizer means.

At step X37, the present speed $VAL_N$ is set as the past speed $VEL_o$ to update the past speed $VEL_o$, and thereafter the flow returns.

If the pitch of a tone to be generated is controlled by such a direction-modified acceleration, sounds such as shown in FIG. 11B can be generated. Specifically, when the scraper operator is activated in the right direction, sounds of higher pitches are generated at the initial stage of performance, and sounds of lower pitches are generated near at the terminating stage of performance.

On the other hand, when the scraper operator is activated in the reverse direction (left direction), the direction value DIR takes a negative value so that sounds of lower pitches are generated at the initial stage and sounds of higher pitches are generated near at the terminating stage. Although the values DIR are set to 1 and −1, these values may be set to 1 and 0 like the above-described embodiment, to distinguish between different processes by judging whether the value DIR is 1 or not.

Figure 12:
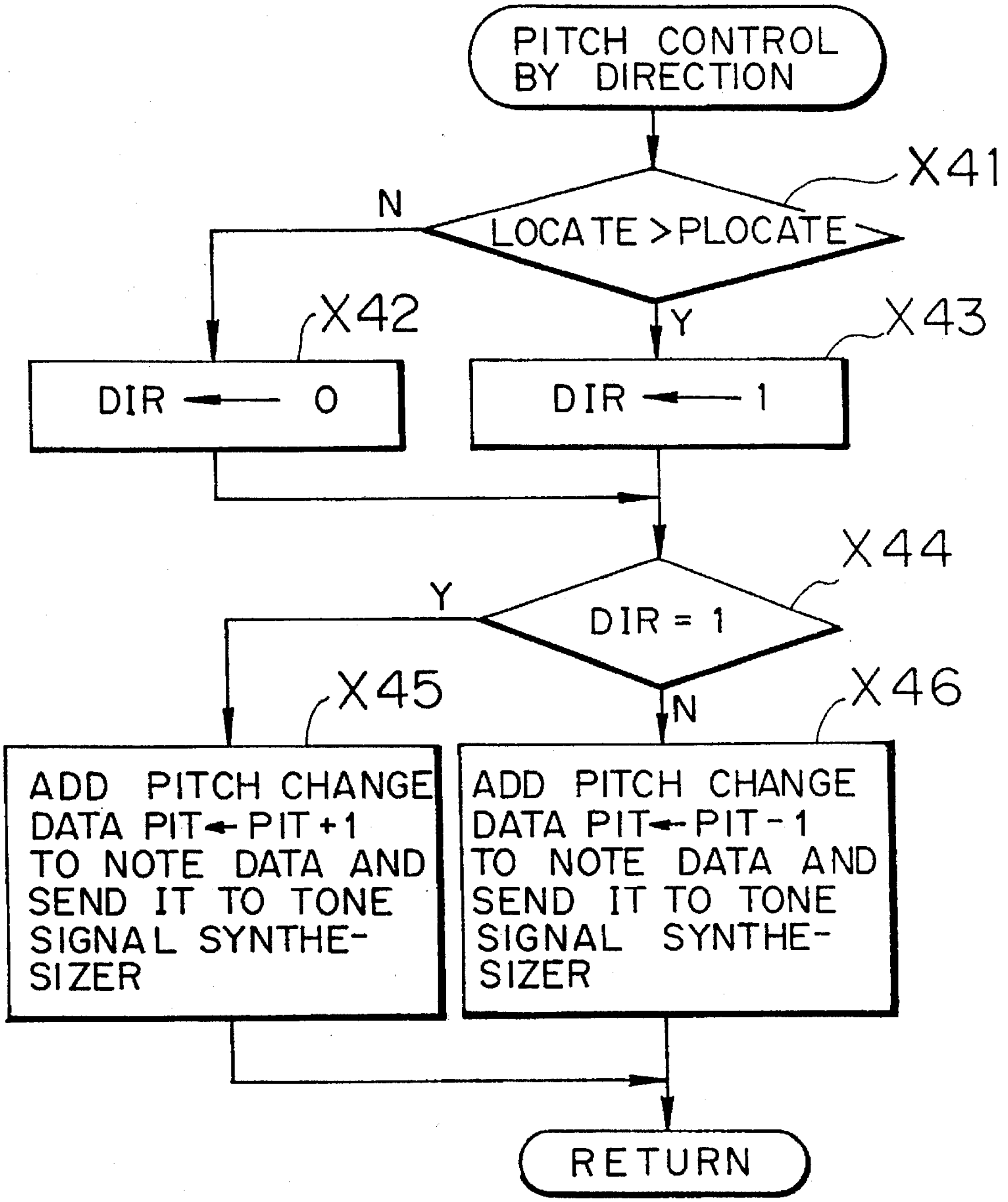
FIG. 12 is a flow chart showing the operation of changing a pitch in accordance with the direction of moving a tool such as a stick.

FIG. 12 is a flow chart illustrating a fifth modification mode wherein the pitch of a tone to be generated is changed with the direction of performance on the scraper operator.

At step X41, it is checked whether the position LOCATE of a presently turned-on switch is greater than the position PLOCATE of the past turned-on switch. If greater, the flow follows an arrow N to advance to step X42 whereat the direction register DIR is set to 0 to indicate the motion to the left side. If not greater, the flow follows an arrow Y to advance to step X43 whereat 1 is set to the direction register to indicate the motion to the right side.

Thereafter, at step X44, it is checked whether the direction register DIR is 1 or not. If DIR=1, it means the motion to the right, and the flow follows an arrow Y to advance to step X45 whereat pitch change data PIT=PIT+1 is added to the note data designated by LOCATE, the result being sent to the tone signal synthesizer means.

As the performance in the right direction continues, the pitch change data PIT gradually increases to generate sounds with gradually rising pitches.

On the other hand, if the direction register DIR is not 1, it means the motion to the left, and the flow follows an arrow N to advance to step X46 whereat pitch change data PIT=PIT−1 is added to the note data designated by LOCATE, the result being sent to the tone signal synthesizer means.

For the performance in the left direction, the pitch of a generated sound is lowered. As the performance in the left direction continues, sounds with gradually lowering pitches are generated.

For example, when the scraper operator is activated in the right direction, sounds with gradually rising pitches C, D, E, F, G, and A are generated. When the scraper operator is activated in the left direction, sounds with gradually lowering pitches A, G, F, E, D, and C are generated.

Sounds whose pitches are raised or lowered at the step of several cents can also be generated by changing the contents of a pitch read ROM provided within the tone signal synthesizer means.

Several examples of controlling musical tones have been described. The modes of controlling musical tones by using the scraper operator are not limited to the above-described modes.

The structure of a scraper operator allowing the above-described performance will be described in detail below.

Figure 13:
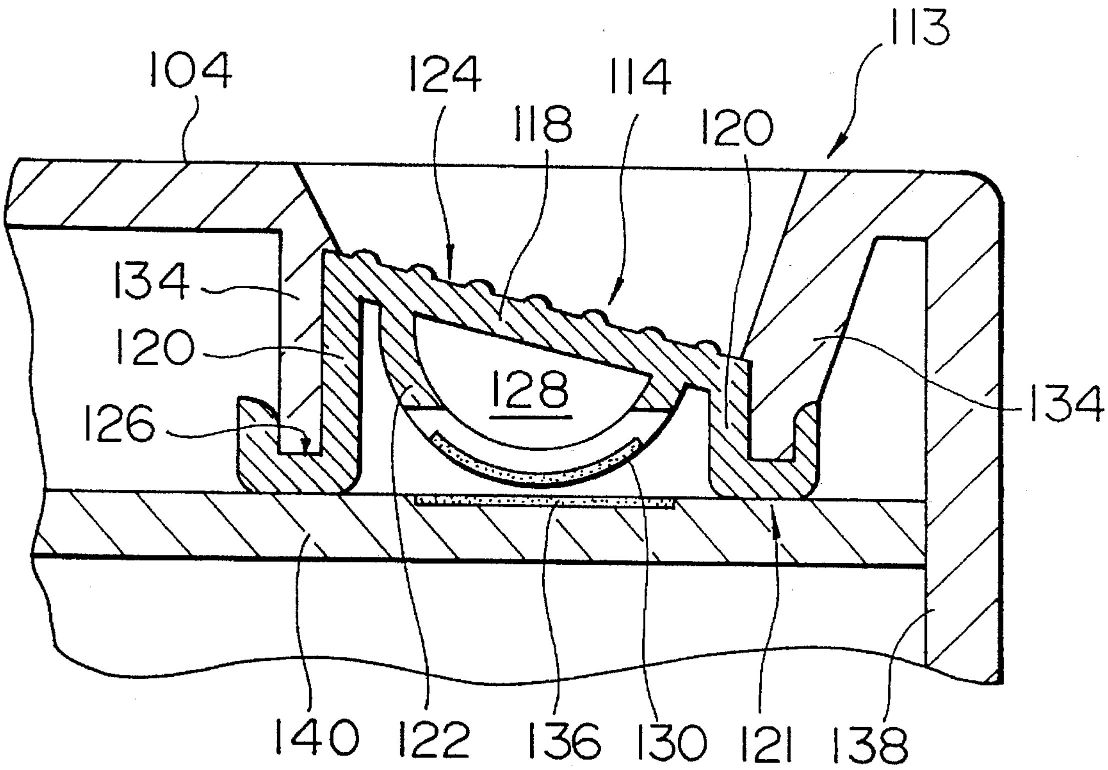
FIG. 13 is a cross sectional view showing an example of the structure of a scraper operator.

FIG. 13 shows the structure in section of a scraper operator device 113.

Figure 14A:
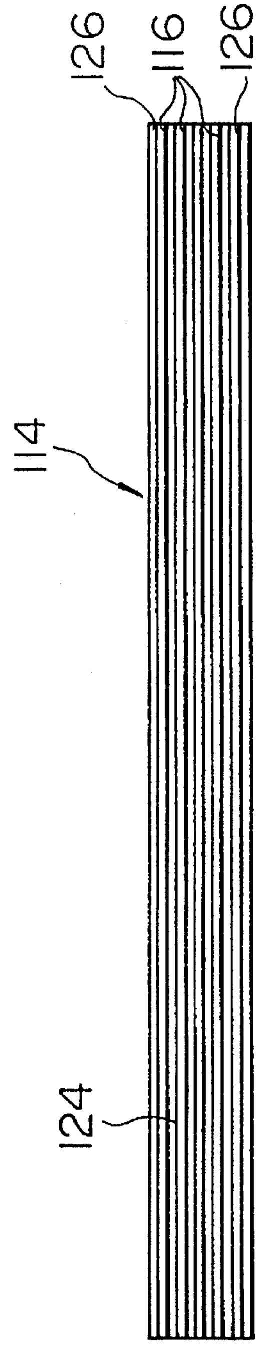
FIGS. 14A to 14C are plan, side, and bottom views of the scraper operator shown in FIG. 13.
Figure 14B:
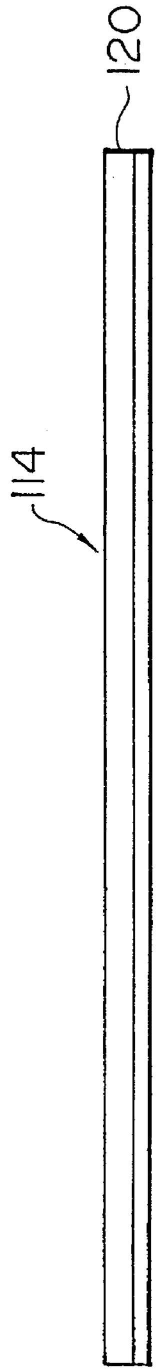
Figure 14C:
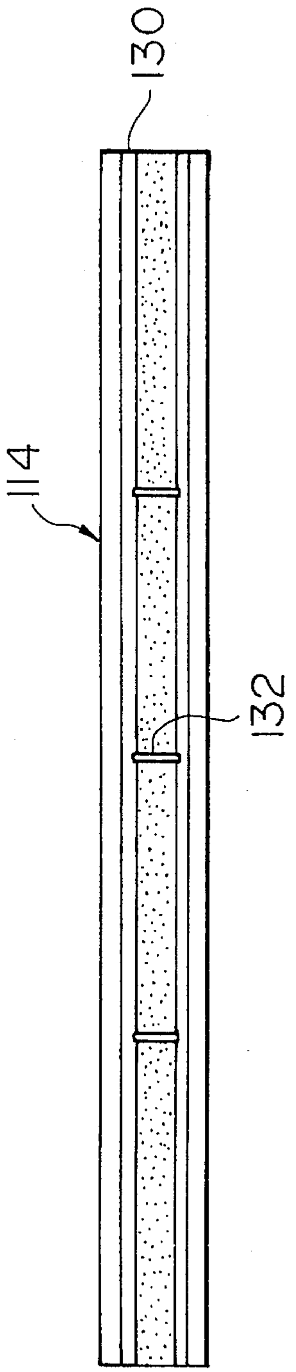

In FIG. 13, reference numeral 114 represents an operator means made of elastic material such as rubber and soft synthetic resin. FIG. 14A is a plan view of the operator member 114, FIG. 14B is a side view thereof, and FIG. 14C is a bottom view thereof.

As shown in FIGS. 13 to 14, the operator unit 114 is constructed of an operator element 118 of an elongated shape, support elements 120 formed on opposite sides of the operator element 118, a semicircle element 122 suspending from the bottom of the operator element 118.

The surface of the operator element 118 forms an operator surface 124 on which protrusions 116 of a semicircular shape in section are formed. These protrusions 116 extend in the lateral direction of the operator unit 114, making a stick or the like easy to move on the operator surface 124 while pressing it. Each support element 120 extends downward from the operator element 118 to form a groove 126 of a channel-shape, the bottom surface of the support element 120 forming a support surface 121.

Space 128 is defined by the operator element 118 and the semicircular element 122 on the bottom of which a conductive unit (movable contact) 130 is formed. This conductive unit 130 is positioned slightly above the support surface 121. As shown in FIG. 14C, the conductive unit 130 extends in the lateral direction. Three slits 132 are formed on the bottom surface of the semicircular element 122.

Preferably, the operator unit 114 and the conductive unit 130 are formed integrally by two-color extrusion molding. The two-color extrusion molding is an extrusion molding which used two different materials. After the operator unit 114 is molded, the conductive unit 130 may be formed thereon.

As shown in FIG. 13, a panel 104 of the musical instrument is formed with an operator unit fixing member (extending downward from the panel) 134 which is fitted in the groove of the support element 120 of the operator unit 114.

Figure 15A:
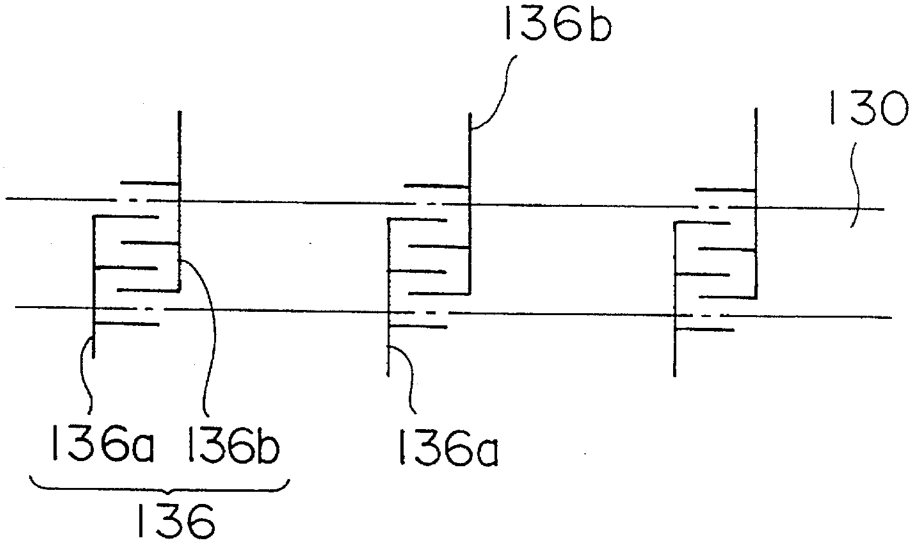
FIGS 15A and 15B are a conceptual diagram of switch contacts of the scraper operator shown in FIG. 13, and its switch circuit diagram.

To the side walls 138 of the instrument housing, an operator unit holding plate 140 on which the operator unit 114 is placed, is fixedly connected. A plurality of fixed contacts 136, e.g., sixteen contacts are formed on the operator holding plate 140 under the movable contact in the lateral direction of the movable contact 130. Each fixed contact has two contacts **136*a* and 136*b* as shown in FIG. 15**A.

In the electronic musical instrument, a bottom wall (not shown) and the panel 104 incline each other. The panel 104 is inclined from the horizontal surface. Although pads are mounted on the plane in parallel with the panel 104 and are inclined from the horizontal surface, the operator unit 114 is mounted on the support surface 121 being inclined therefrom such that the operator surface 124 is in parallel with the bottom wall of the electronic musical instrument. Therefore, in this embodiment, the operator surface 124 of the operation unit 114 is horizontal.

In assembling the operator unit with the electronic musical instrument, prior to mounting the panel on the instrument, the operator unit 114 is first placed on the support element holding plate 140, with the support surface being in abutment with the holding plate 140. Thereafter, the operator unit fixing elements 134 of the panel 104 are fitted, from the upward, down into the grooves 126 of the operator 114, to thereby squeezing the operator unit 114 between the operator unit fixing element and the holding plate 140.

Lastly, the panel is fixed to the instrument by using suitable means. As appreciated from the above description, fixing means such as screws, bolts, adhesive agent or the like is not required for fixing the operator unit to the electronic musical instrument, allowing an easy assembly of the scraper operator device with the electronic musical instrument.

In giving a performance by using the operator unit 114 having the structure described above, a tool such as a stick is rubbed over the operator surface 124 of the operator unit 114 to generate corresponding sounds.

When a stick or the like is rubbed over the operator surface 124 of the operator unit 114, the force applied to the surface 124 causes the surface 124 to expand and deform between the support elements 120. As a result, the conductive unit 130 locally contacts the operator unit holding plate 140 to electrically connect together the contacts **136*a* and 136*b* on the plate 140. When the stick or the like is moved away from the operator unit surface 124, the surface 124 of the operator unit 114** restores the original position by the elastic force thereof, to turn the switch off.

Figure 15B:
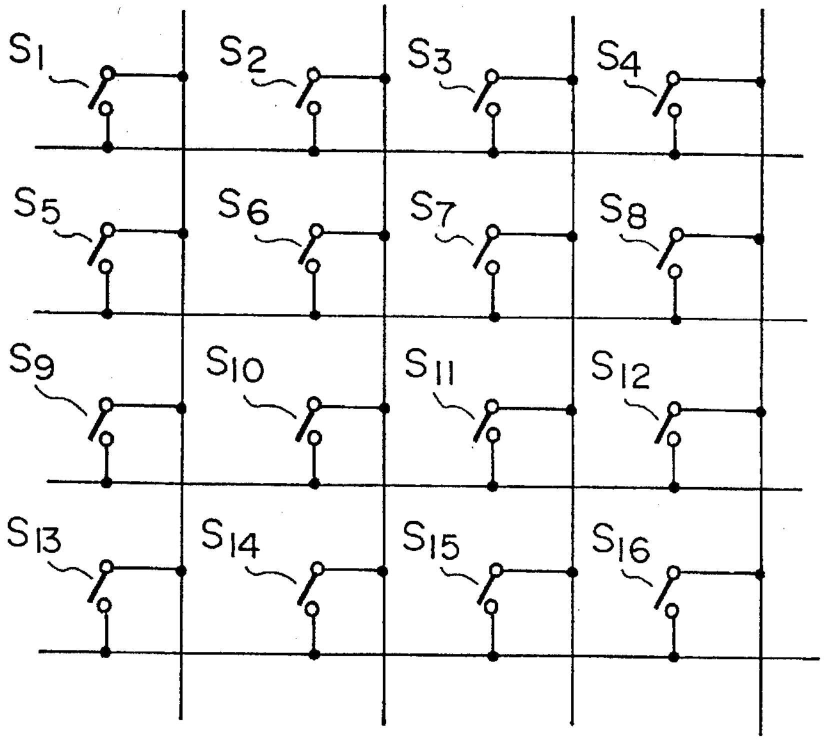

FIG. 15B shows an example of a circuit for detecting on/off of a plurality of switches 5 each having the movable contact 130 and fixed contact 136. As shown in FIG. 15B, a plurality of switches S1 and S16 are wired in a matrix shape to detect on/off of each switch S1 to S16.

IN order to generate a tone signal upon turning on a switch Si, a tone signal is assigned in advance to each of the switches S1 to S16, so that a tone signal specific to the turned-on switch can be generated. Various methods for assigning musical tones are possible. For example, a method of assigning the same tone color and different pitches to the switches S1 to S16, a method of assigning different tone colors and the same pitch interval, a method of assigning the same tone color and pitch interval and different pitches.

Figure 16:
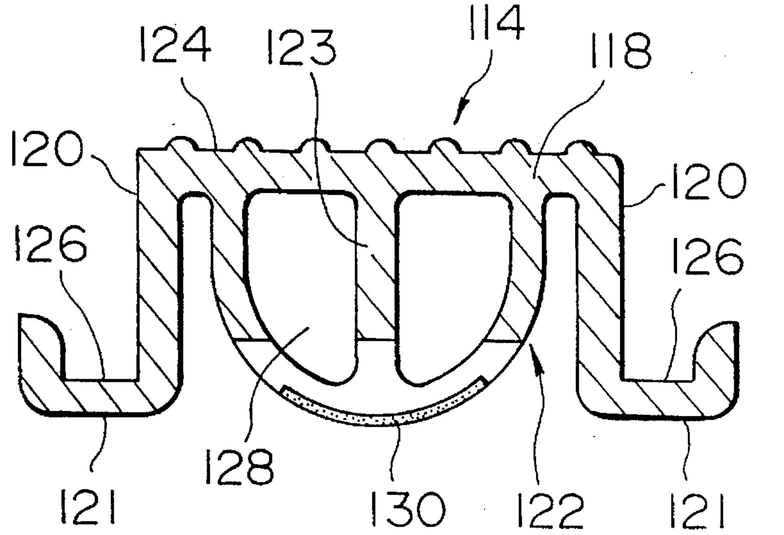
FIG. 16 is a cross sectional view showing an example of another structure of the scraper operator.
Figure 17:
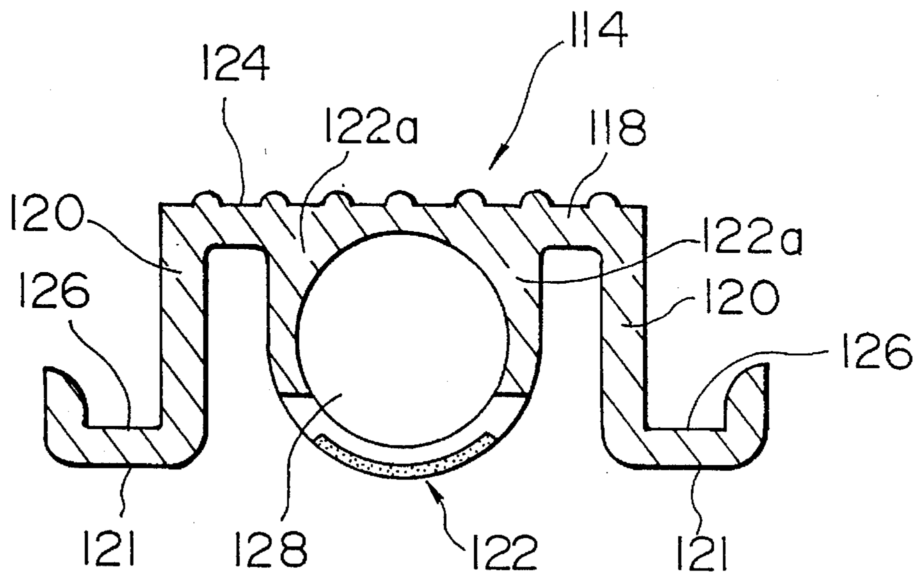
FIG. 17 is a cross sectional view showing an example of another structure of the scraper operator.

FIGS. 16 and 17 are cross sectional views showing other structures of a scraper operator unit. The different points of the operator unit 114 shown in FIG. 16 from the shown in FIG. 13 reside in that a vertical partition wall 123 is formed in the space 128 defined by the semicircular element 122 and operator element 118 and the the operator surface 124 is formed in parallel with the support surface 121.

With the embodiment shown in FIG. 16, it is possible to reliably transmit the force applied by the stick or the like to the switch via the partition wall 123.

The different points of the operator unit 114 shown in FIG. 17 from that shown in FIG. 13 reside in that a thick wall unit **122*a* is formed at the upper portion of the element 122 so as to form the space substantially of a circle and that the operator surface 124 is formed in parallel with the support surface 121**.

With the embodiment shown in FIG. 17, it is possible to reliably transmit the force applied by the stick or the like to the switch because of a higher rigidity of the circle element 122.

Figure 18:
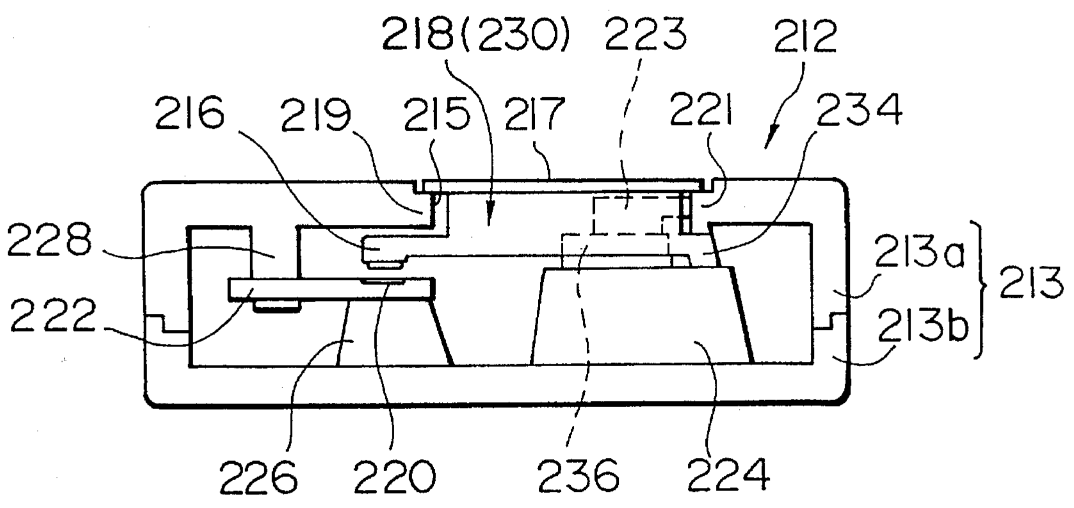
FIG. 18 is a cross sectional view showing an example of another structure of the scraper operator.
Figure 19:
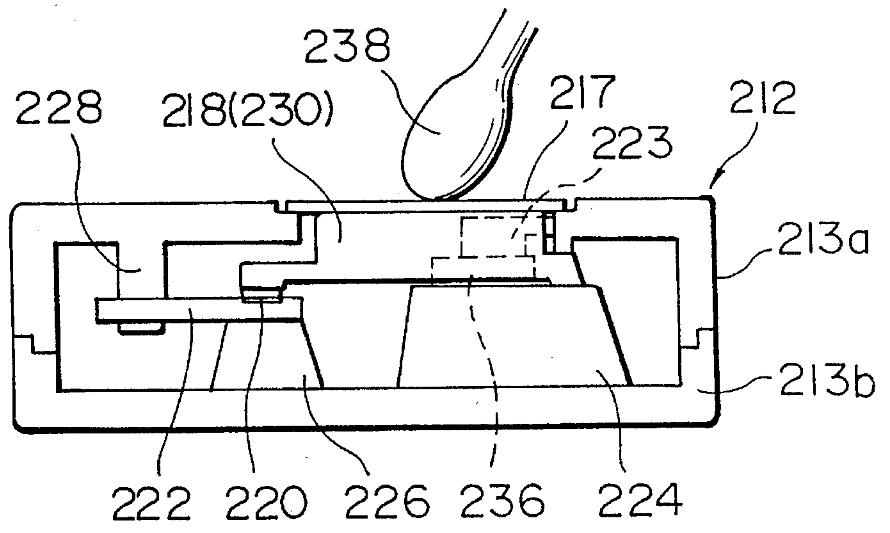
FIG. 19 is a cross sectional view illustrating the operation of the scraper operator shown in FIG. 18.
Figure 20:
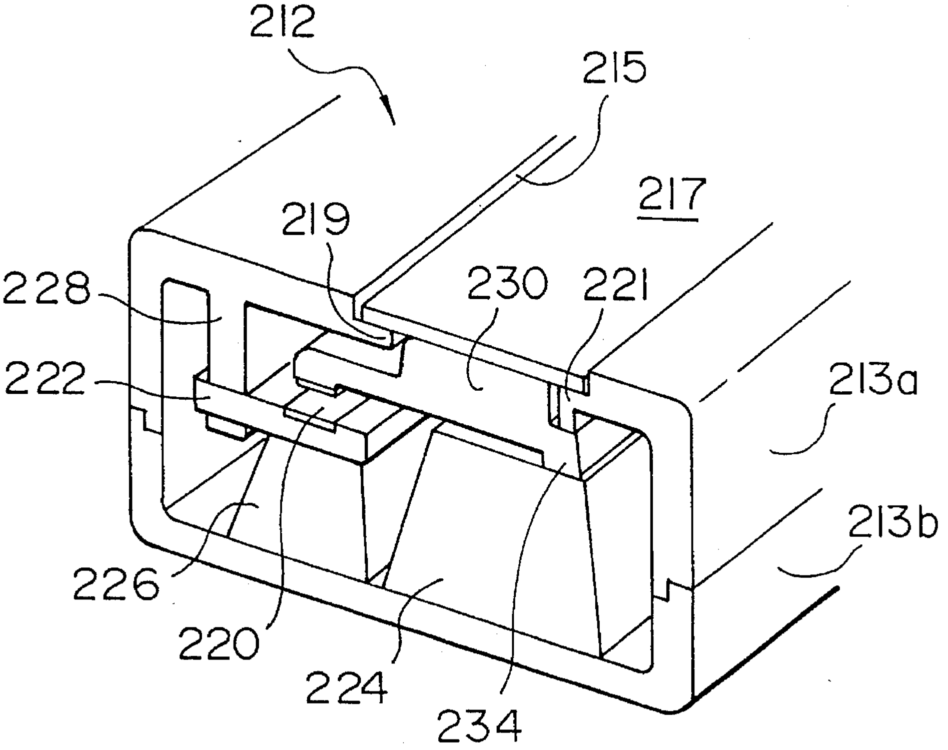
FIG. 20 is a perspective view of the scraper operator shown in FIG. 18.

FIGS. 18 to 20 show examples of other structures of a scraper operator device. The cabinet 213 of this device has an upper cabinet **213*a* and lower cabinet 213*b*. The upper cabinet 213*a* is formed with an opening 215 in the lateral direction of the device. An operator sheet 217 is mounted extending on and between support elements 219 and 221 formed in the upper cabinet 213*b* along the opening 215, to thereby cover the opening 215**.

Housed within the cabinet 213 are a movable operator element 218 having movable contacts 216, and a base plate 222 having fixed contacts 220 facing the movable contact 216. The movable contact and fixed contact constitute a switch.

Two ribs 224 and 226 are formed on the lower cabinet **213*b*, the movable operator element 218 being placed on the rib 224, and the base plate 222 being placed on the other rib 226**.

The base plate 222 is also supported by a rib 228 extending downward from the upper cabinet **213*a***.

Figure 21:
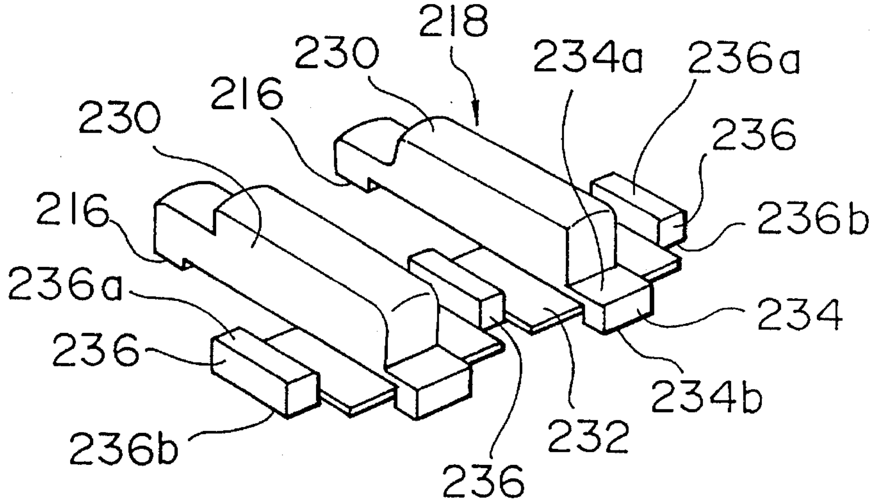
FIG. 21 is a perspective view of the movable operator member of the scraper operator shown in FIG. 18.

FIG. 21 is a perspective view showing only the movable operator element 218 of the scraper operator unit 212.

The movable operator element 218 is constructed of a plurality of movable operator components, e.g., sixteen movable operator elements, and a coupling member 232 connected to one end portion of each movable operator element for coupling the movable operator elements 230 in unison. One end portion of each movable operator element 230 is formed with a support element 234. The top surface of each support element 234 is a supported surface **234*a* in abutment with the lower surface of the support element 221 of the upper cabinet, whereas the bottom surface thereof is a supported surface 234*b* in abutment with a rib 224**.

A plurality of projections 223 are mounted at a predetermined interval extending to the left from the support element 221 of the upper cabinet **213*a***.

The coupling member 232 is formed with support elements 236 in correspondence with the projections 223. The top surface of each support element 236 is a supported surface **236*a* in abutment with each projection 223 of the upper cabinet 213*a*, whereas the bottom surface thereof is a supported surface 236*b* in abutment with the rib 224. The support unit 230 formed at one end of each movable operator element 230 and the coupling member 232** constitute a base unit.

These movable operator elements 230, coupling member 232, and support elements 234 and 236 are made of elastic materials such as rubber and soft synthetic resin. They are integrally formed by means of extrusion molding.

The base unit of the movable operator element 218 is squeezed between the upper cabinet **213*a* and rib 236*b* when the support element 221, projection 223, and rib 224 of the upper cabinet 213*a* become in abutment with the supported surfaces 234*a*, 234*b*, 236*a*, and 236*b* of the support elements 234 and 236. In each movable operator element 230, three support elements, including the support element 234 and two support elements 236 on the coupling member 232 on both sides of the movable operator element 230, which are squeezed between the rib 224 of the lower cabinet 213*b* and the upper cabinet, serve as a fixed end. The other end portion with the movable contact 216 of each movable operator element 230 serves as a free end. In a normal state, the movable and fixed contacts 216 and 220** are spaced apart from each other because of the recovery force at the three hinged areas.

In assembling the movable operator unit 218 with the scraper operator device 212, the movable operator unit 218 is simply squeezed between the rib 224 of the lower cabinet 213*b* and the upper cabinet 213*a*, without using any fixing means such as screws, bolts, adhesive agent, and the like.

Furthermore, the hinged areas are provided not only at the end of each movable operator element 230 but also on both sides of the element 230. Therefore, a sufficient recovery force can be provided, and in addition, force will not be concentrated only upon the back hinged area 234 even if a rubbing operation is executed (even if force is applied in the lateral direction of the movable operator element), because the coupling member 232 is deflected.

Still further, maintenance and assembly are easy since the movable operator unit 218 is formed integrally.

Figure 22A:
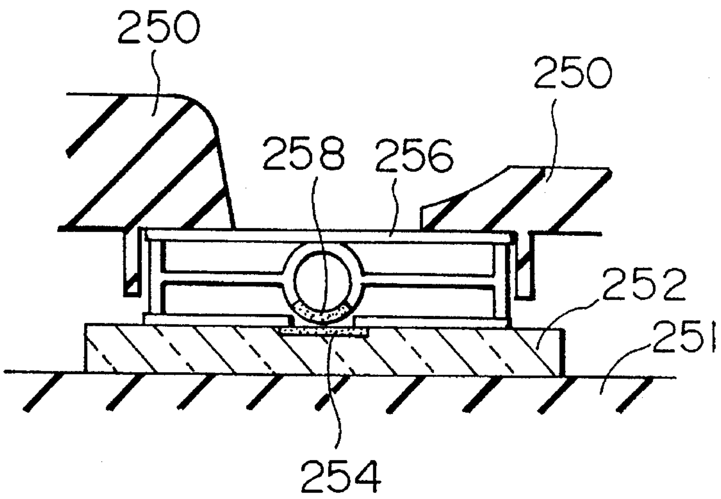
FIGS. 22A and 22B are cross sectional views illustrating the still state and active state of another example of the structure of the scraper operator.
Figure 22B:
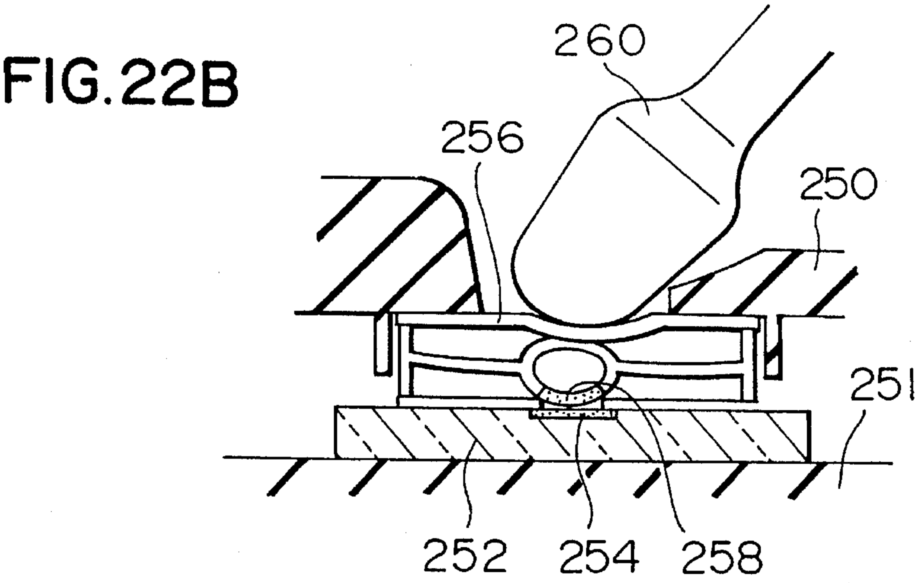

FIGS. 22A and 22B show another structure of a scraper operator. As shown in FIG. 22A, between upper and lower cabinets 250 and 251, there are mounted an elastic member 256 with a conductive strip 258 and a base plate 252 with a resistive strip 254. The conductive strip 258 is positioned above the resistive strip 254, being spaced apart by a predetermined gap.

As shown in FIG. 22B, when the elastic member 256 is pushed down by a stick 260, the elastic member 256 deforms so that the depressed area of the conductive strip 258 contacts the resistive strip 254. With a predetermined voltage applied between both ends of the resistive strip 254, a voltage corresponding to the depressed position can be detected from the conductive strip 258.

Figure 23:
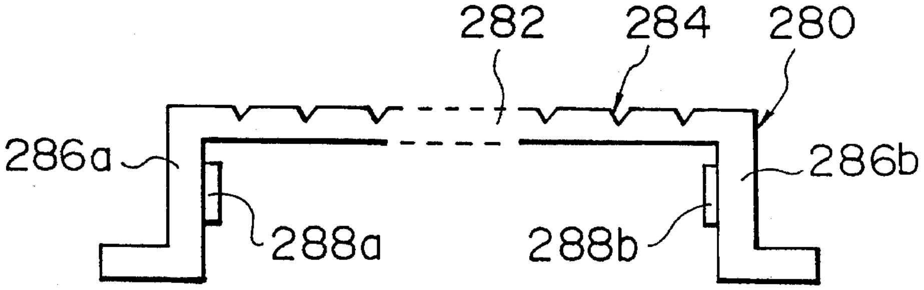
FIG. 23 is a cross sectional view of another structure of a scraper operator.

FIG. 23 shows another structure of a scraper operator. A main frame 280 has a cross section generally of a channel shape. The top surface of an upper unit 282 has notches 284 formed at an equal pitch. Vibration detectors 288*a* and 288*b* are mounted on opposite leg units 286*a* and 286*b*.

When a stick is rubbed over the top surface, vibrations (impacts) generate from the notches 284, and transmit to the vibration detectors 286*a* and 286*b*. A difference between distances from the vibration generating notch to both the vibration detectors provides a time difference between signals detected by the vibration detectors. It is therefore possible to identify from this time difference the vibration generating notch.

Various structures of a scraper operator have been described above. The invention is not intended to be limited only to such structures. For example, ultrasonic waves may be transmitted along the operator surface to detect the position of a tool such as a stick operated near the operator surface, by detecting the reflected wave from the tool.

In the above embodiments, predetermined tone signal synthesizing parameters and parameter changing data are independently supplied to the tone signal synthesizer means. Both the parameters and parameter changing data may be supplied to and processed by CPU, to thereafter send the result to the tone signal synthesizer means.

Although the present invention has been described in connection with the preferred embodiments, the present invention is not intended to be limited only to those embodiments. For example, it is apparent that various changes, improvements, combinations and the like can be made by those skilled in the art.

We claim:

1. An electronic musical instrument comprising:

operator means having a predetermined operation length in a predetermined operation direction along a linear axis thereof, for detecting at least one of access, contact, and push of an operating member, and generating a plurality of signals to be detected within the range of said operation length, from a plurality of signal sources, each of the signal sources being generally equally spaced apart at a predetermined distance along the linear axis;

time interval means for receiving the signals detected by said operator means and generating a time interval signal representing a time difference between consecutively detect signals from consecutive signal sources to determine a velocity; and tone signal synthesizing means for generating a tone signal in accordance with said detected signal and said velocity determined from said time interval signal, wherein the tone signal synthesizing means generates a separate tone signal with a predetermined duration each time said operator means generates said signal to be detected.

2. An electronic musical instrument according to claim 1, wherein the tone signal synthesizing means generates the same tone signal each time said scraper operator means generates said signal to be detected, regardless of which signal source of said operator means generates said signal to be detected, and one of the pitch and tone color of said tone signal is modified based on said velocity determined from said time interval signal.

3. An electronic musical instrument according to claim 1, wherein the plurality of signal sources comprises a plurality of switches, within the range of said operation length, each of which generates a signal in response to said at least one of access, contact and push of said operating member thereto, and said time interval means generates a time interval signal corresponding to the time interval between the signal-generation timings of two adjacent to each other, among said plurality of switches to determine said velocity.

4. An electronic musical instrument comprising:

operator means having a predetermined operation length in a predetermined operation direction along a linear axis thereof, for detecting at least one of access, contact, and push of an operating member, and generating a plurality of signals to be detected within the range of said operation length, from a plurality of signal sources, each of the signal sources being generally equally spaced apart at a predetermine distance along the linear axis;

time interval means for receiving the signals detected by said operator means and generating a time interval signal representing a time difference between consecutively detected signals from consecutive signal sources to determine a velocity;

tone signal synthesizing means for generating a tone signal in accordance with said detected signal; and tone modifying signal generating means for generating a tone modifying signal in accordance with said detected signal and said velocity determined from said time interval signal, wherein the tone signal synthesizing means generates a separate tone signal with a predetermined duration each time said operator means generates said signal to be detected.

5. An electronic musical instrument according to claim 4, wherein said tone modifying signal is a signal for modifying a sound volume.

6. An electronic musical instrument according to claim 4, wherein said tone modifying signal is a signal for modifying a pitch.

7. An electronic musical instrument according to claim 4, wherein said tone modifying signal is a signal for modifying a tone color.

8. An electronic musical instrument according to claim 4, wherein the tone signal synthesizing means generates the same tone signal each time said scraper operator means generates said signal to be detected, regardless of which signal source of said operator means generates said signal to be detected, and one of the pitch and tone color of said tone signal is modified based said tone modifying signal generated by said tone modifying signal generating means.

9. An electronic musical instrument according to claim 4, wherein the plurality of signal sources comprises a plurality of switches, within the range of said operation length, each of which generates a signal in response to said at least one of access, contact and push of said operating member thereto, and said time interval means generates a time interval signal corresponding to the time interval between the signal-generation timings of two, adjacent to each other, among said plurality of switches to determine said velocity.

10. An electronic musical instrument comprising:

operator means having a predetermined operation length in a predetermined operation direction, for detecting at least one of access, contact, and push of an operating member, and generating a plurality of signals to be detected within the range of said operation length from a plurality of signal sources that are generally equally spaced apart at a predetermined distance between adjoining signal sources along said operation length;

time interval means for receiving the signals detected by said operator means and generating a time interval signal between consecutively detected signals from consecutive signal sources that substantially represent a velocity of said operating member;

tone modifying signal generating means for generating a tone modifying signal in accordance with a difference between a plurality of said time intervals, substantially representing acceleration of said operating member; and tone signal synthesizing means for generating a tone signal in accordance with said detected signal each time said operator means generates said signal to be detected, and with said tone amplifying signal.

11. An electronic musical instrument comprising:

operator means having a predetermined operation length in a predetermined operation direction, for detecting at least one of access, contact, and push of an operating member, and generating a plurality of signals to be detected within the range of said operation length from a plurality of signal sources that are generally equally spaced apart at a predetermined distance between adjoining signal sources along said operation length;

time interval means for receiving the signals detected by said operator means and generating a time interval signal representing a time difference between consecutively detected signals from consecutive signal sources to determine a velocity;

tone signal synthesizing means for generating a tone signal in accordance with said detected signal and said velocity determined from said time interval signal each time said operator means generates said signal to be detected;

manipulation direction data deriving means for deriving manipulation direction data from a plurality of said detected signals produced from said plurality of signal sources; and tone control signal generating means for generating a tone control signal to be generated by said tone signal synthesizing means, in accordance with said manipulation direction data.

12. An electronic musical instrument comprising:

operator means having a predetermined operation length in a predetermined operation direction, for detecting at least one of access, contact, and push of an operating member, and generating a plurality of signals to be detected within the range of said operation length from a plurality of signal sources that are generally equally spaced apart at a predetermined distance between adjoining signal sources along said operation length;

time interval means for receiving the signals detected by said operator means and generating a time interval signal representing a time difference between consecutively detected signals from consecutive signal sources;

tone signal synthesizing means for generating a tone signal in accordance with said detected signal each time said operator means generates said signal to be detected;

manipulation direction data deriving means for deriving manipulation direction data from a plurality of said detected signals produced from the plurality of signal sources; and tone modifying signal generating means for generating a tone modifying signal to be generated by said tone signal synthesizing means, in accordance with said manipulation direction data.

13. An electronic musical instrument comprising:

a housing;

a plurality of pads, disposed on said housing, each of which generates a pad-operation signal in response to a player's operation thereto;

a scraper operator, disposed on said housing, having a predetermined operation length in a predetermined operation direction and having a plurality of switches, each of which generates a scraper-operation signal in response to at least one of access, contact, and push of an operating member thereto, each of which is generally equally spaced apart along the operation length;

time interval means for generating a time interval signal corresponding to the time interval between succeeding signals from adjacent switches of said scraper operator to determine a velocity; and tone signal synthesizing means for generating tone signals in response to said pad-operation signal, said scraper-operation signal and said velocity determined from said time interval signal, wherein the tone signal synthesizing means generates a separate tone signal with a predetermined duration each time one of said switches of said scraper operator generates said scraper-operation signal.

14. An electronic musical instrument comprising:

operator means having a predetermined operation length in a predetermined operation direction along a linear axis thereof, for detecting at least one of access, contact, and push of an operating member, and generating a plurality of signals to be detected within the range of said operation length, from a plurality of signal sources, each of the signal sources being generally equally spaced apart at a predetermined distance along the linear axis;

time interval means for receiving the signals detected by said operator means and generating a time interval signal representing a time difference between consecutively detected signals from consecutive signal sources to determine a velocity; and tone signal synthesizing means for generating a tone signal in accordance with said detected signal and said velocity determined from said time interval signal each time said operator means generates said signal to be detected, wherein said operation direction is detected to generate different tone signals in accordance with said detected operation direction.

15. An electronic musical instrument comprising:

operator means having a predetermined operation length in a predetermined operation direction along a linear axis thereof, for detecting at least one of access, contact, and push of an operating member, and generating a plurality of signals to be detected within the range of said operation length, from a plurality of signal sources, each of the signal sources being generally equally spaced apart at a predetermined distance along the linear axis;

time interval means for receiving the signals detected by said operator means and generating a time interval signal representing a time difference between consecutively detected signals from consecutive signal sources to determine a velocity;

tone signal synthesizing means for generating a tone signal in accordance with said detected signal each time said operator means generates said signal to be detected; and tone modifying signal generating means for generating a tone modifying signal in accordance with said detected signal and said velocity determined from said time interval signal, wherein said operation direction is detected to generate different tone signals in accordance with said detected operation direction.

16. An electronic musical instrument comprising:

operator means having a predetermined operation length in a predetermined operation direction along a linear axis thereof, for detecting at least one of access, contact, and push of an operation member, and generating a plurality of signals to be detected within the range of said operation length, from a plurality of signal sources, each of the signal sources being generally equally spaced apart at a predetermined distance along the linear axis;

time interval means for receiving the signals detected by said operator means and generating a time interval signal representing a time difference between consecutively detected signals from consecutive signal sources to determine a velocity; and tone signal synthesizing means for generating a tone signal in accordance with said detected signal and said velocity determined from said time interval signal each time said operator means generates said signal to be detected, wherein said operation direction is detected to generate different tone signals in accordance with said detected operation direction, and said tone signal is modified in accordance with said operation direction and said velocity determined from said time interval signal.

17. An electronic musical instrument comprising:

operator means having a predetermined operation length in a predetermined operation direction along a linear axis thereof, for detecting at least one of access, contact, and push of an operating member, and generating a plurality of signals to be detected within the range of said operation length, from a plurality of signal sources, each of the signal sources being generally equally spaced apart at a predetermined distance along the linear axis;

time interval means for receiving the signals detected by said operator means and generating a time interval signal representing a time difference between consecutively detected signals from consecutive signal sources to determine a velocity;

tone signal synthesizing means for generating a tone signal in accordance with said detected signal each time said operator means generates said signal to be detected; and tone modifying signal generating means for generating a tone modifying signal in accordance with said detected signal and said velocity determined from said time interval signal, wherein said operation direction is detected to generate different tone signals in accordance with said detected operation direction, and said tone signal is modified in accordance with said operation direction and said velocity determined from said time interval signal.

* * * * *